United States Patent
Wandera

(10) Patent No.: US 11,380,961 B2
(45) Date of Patent: Jul. 5, 2022

(54) POROUS MEMBRANES, FREESTANDING COMPOSITES, AND RELATED DEVICES AND METHODS

(71) Applicant: AMTEK RESEARCH INTERNATIONAL LLC, Lebanon, OR (US)

(72) Inventor: Daniel Wandera, Corvallis, OR (US)

(73) Assignee: Amtek Research International LLC, Lebanon, OR (US)

( * ) Notice: Subject to any disclaimer, the term of this patent is extended or adjusted under 35 U.S.C. 154(b) by 227 days.

(21) Appl. No.: 16/622,241

(22) PCT Filed: Jun. 15, 2018

(86) PCT No.: PCT/US2018/037852
§ 371 (c)(1),
(2) Date: Dec. 12, 2019

(87) PCT Pub. No.: WO2018/232302
PCT Pub. Date: Dec. 20, 2018

(65) Prior Publication Data
US 2020/0106071 A1    Apr. 2, 2020

Related U.S. Application Data

(60) Provisional application No. 62/520,444, filed on Jun. 15, 2017.

(51) Int. Cl.
*H01M 50/411* (2021.01)
*H01M 50/403* (2021.01)
(Continued)

(52) U.S. Cl.
CPC ....... *H01M 50/411* (2021.01); *H01M 50/403* (2021.01); *H01M 50/449* (2021.01); *H01M 50/463* (2021.01)

(58) Field of Classification Search
CPC ............ H01M 50/411; H01M 50/403; H01M 50/463; H01M 50/449
See application file for complete search history.

(56) References Cited

U.S. PATENT DOCUMENTS

| 4,298,666 A | 11/1981 | Taskier |
| 5,362,582 A | 11/1994 | Chang et al. |

(Continued)

FOREIGN PATENT DOCUMENTS

| GB | 1298072 A | 11/1972 |
| WO | 2018027187 A1 | 2/2018 |

OTHER PUBLICATIONS

PCT/US2018/037852, et al., International Preliminary Report on Patentability, dated Aug. 29, 2019,14 pages.

(Continued)

*Primary Examiner* — James Lee
(74) *Attorney, Agent, or Firm* — Dorsey & Whitney LLP

(57) ABSTRACT

The disclosed porous membranes and freestanding composites containing the porous membranes have a solution-cast three-dimensional polymer matrix defining interconnecting pores that provide overall first major surface-to-second major surface fluid permeability. The porous membranes and freestanding composites can be used to separate lead-acid battery electrodes. The porous membranes and freestanding composites can have high porosity and low electrical resistance while having both excellent flexibility and mechanical strength. This can reduce the probability of damage to the separators during battery assembly and also allow production of battery separators with a high overall height, but a minimal backweb thickness.

20 Claims, 20 Drawing Sheets

(51) Int. Cl.
    *H01M 50/463*     (2021.01)
    *H01M 50/449*     (2021.01)

(56)         References Cited

U.S. PATENT DOCUMENTS 5,795,920  A    8/1998  Kang et al.
 2002/0001753  A1   1/2002  Pekala et al.
 2004/0060864  A1   4/2004  Shepodd et al.
 2010/0129720  A1   5/2010  Sako et al.
 2014/0116944  A1   5/2014  Hu et al.
 2016/0013461  A1   1/2016  Mizuno et al.
 2017/0049549  A1   2/2017  Bayat et al.
 2017/0113192  A1   4/2017  McGinnis et al.

OTHER PUBLICATIONS

PCT/US2018/037852, et al., International Search Report and Written Opinion, dated Sep. 25, 2018, 7 pages.

1 μm

1 μm

20 μm

20 μm

1 μm

1 μm

1 μm

20 μm

20 μm

POROUS MEMBRANES, FREESTANDING COMPOSITES, AND RELATED DEVICES AND METHODS

RELATED APPLICATIONS

This application is a National Stage of International Application No. PCT/US2018/037852, filed Jun. 15, 2018, entitled POROUS MEMBRANES, FREESTANDING COMPOSITES, AND RELATED DEVICES AND METHODS, which claims priority benefit of U.S. Provisional Patent Application No. 62/520,444, filed Jun. 15, 2017, entitled SOLUTION CAST COMPOSITE MEMBRANES AND METHODS RELATED THERETO, the contents of both of which are hereby incorporated by reference in their entireties.

COPYRIGHT NOTICE

© 2018 Amtek Research International LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 C.F.R. § 1.71(d).

TECHNICAL FIELD

This disclosure relates to separators for lead-acid battery electrodes and, in particular, to porous membranes and freestanding composites containing the porous membranes having a solution-cast three-dimensional polymer matrix defining interconnecting pores that provide overall first major surface-to-second major surface fluid permeability, for separating electrodes in lead-acid batteries.

BACKGROUND INFORMATION

The recombinant cell and the flooded cell are two different types of commercially available lead-acid battery designs that are used in many automotive and industrial (e.g., forklift) applications. Both types include adjacent positive and negative electrodes that are separated from each other by a porous battery separator. The porous separator prevents the adjacent electrodes from coming into physical contact and provides space for an electrolyte to reside. Such separators are formed of materials that are sufficiently porous to permit the electrolyte to reside in the pores of the separator material, thereby permitting ionic current flow between adjacent positive and negative plates.

The first type of lead-acid battery, the recombinant battery, or valve-regulated lead-acid battery, typically has an absorptive glass mat (AGM) separator composed of microglass fibers. While AGM separators provide high porosity (>90%), low ionic resistance, and uniform electrolyte distribution, they are relatively expensive and still do not offer precise control over oxygen transport rate or the recombination process. Furthermore, AGM separators exhibit low puncture resistance that is problematic for two reasons: (1) the incidence of short circuits increases, and (2) manufacturing costs are increased because of the fragility of the AGM sheets. In some cases, battery manufacturers select thicker, more expensive separators to improve the puncture resistance, while recognizing that the ionic resistance increases with thickness.

In the case of a recombinant battery using an AGM, the sulfuric acid is essentially "immobilized" within the three-dimensional glass mat structure, enabling the battery to be positioned without concern of acid spillage. In an alternate version of a recombinant battery, the sulfuric acid is mixed with fumed silica under high shear and temperature to form a mixture that "gels" after injection into a battery containing separators between the plates, such as microporous polyethylene separators or phenolic separators. In this case, a thixotropic gel without chemical cross-links is formed because the silica provides a significant increase in the viscosity of the acid, making it less susceptible to spillage. This latter description is often referred to as a gel battery.

The second type of lead-acid battery, the flooded battery, has only a small portion of the electrolyte absorbed into the separator. The remaining portion of the acid between the electrodes is in a continuous liquid state. Flooded battery separators typically include porous derivatives of cellulose, polyvinyl chloride, rubber, and polyolefins. More specifically, microporous polyethylene separators are commonly used because of their ultrafine pore size, which inhibits dendritic growth while providing low ionic resistance, high puncture strength, good oxidation resistance, and excellent flexibility. These properties facilitate sealing of the battery separator into a pocket or envelope configuration into which a positive or negative electrode can be inserted.

Most flooded lead-acid batteries include polyethylene separators. The term "polyethylene separator" is something of a misnomer because these microporous separators require large amounts of precipitated silica to be sufficiently wettable by sulfuric acid electrolyte. The volume fraction of precipitated silica and its distribution in the separator generally control its ionic permeability, while the volume fraction and orientation of polyethylene in the separator generally control its mechanical properties. The porosity range for commercial polyethylene separators is generally 50%-60%.

A sub-category of the flooded lead-acid battery is the dry-charged battery. This battery is built, charged, washed and dried, sealed, and shipped without electrolyte. It can be stored for up to 18 months. Before use, liquid electrolyte (acid) is added and the battery is given a conditioning charge. Batteries of this type have a long shelf life. Motorcycle batteries are typically dry charged batteries. The acid between the electrodes and the separator is in a continuous liquid state.

A need exists for membranes with improved properties.

SUMMARY OF THE DISCLOSURE

The disclosed porous membranes have first and second opposite major surfaces. Unitary, regularly-shaped and regularly-spaced protrusions are formed in the first major surface. The porous membrane includes a solution-cast three-dimensional polymer matrix defining interconnecting pores that provide overall first major surface-to-second major surface fluid permeability. The polymer matrix provides innate electrolyte-wettability to surfaces of the interconnecting pores. The porous membranes can be combined with a substrate to form a freestanding composite. Additionally, two porous membranes can be laminated together to form a freestanding composite.

The porous membranes and freestanding composites can be used to separate lead-acid battery electrodes. The porous membranes and freestanding composites can have high porosity and low electrical resistance while having both excellent flexibility and toughness. This can reduce the probability of damage to the separators during battery assembly and also allow production of battery separators with a high overall height, but a minimal backweb thickness. The porous membranes and freestanding composites are made without use of plasticizer or processing oil and can be manufactured without the environmental concerns associated with solvents utilized for extracting plasticizers and processing oils. The porous membranes and freestanding composites can be manufactured with rib patterns on both sides of the separator that are different from each other.

DETAILED DESCRIPTION

Figure 1:
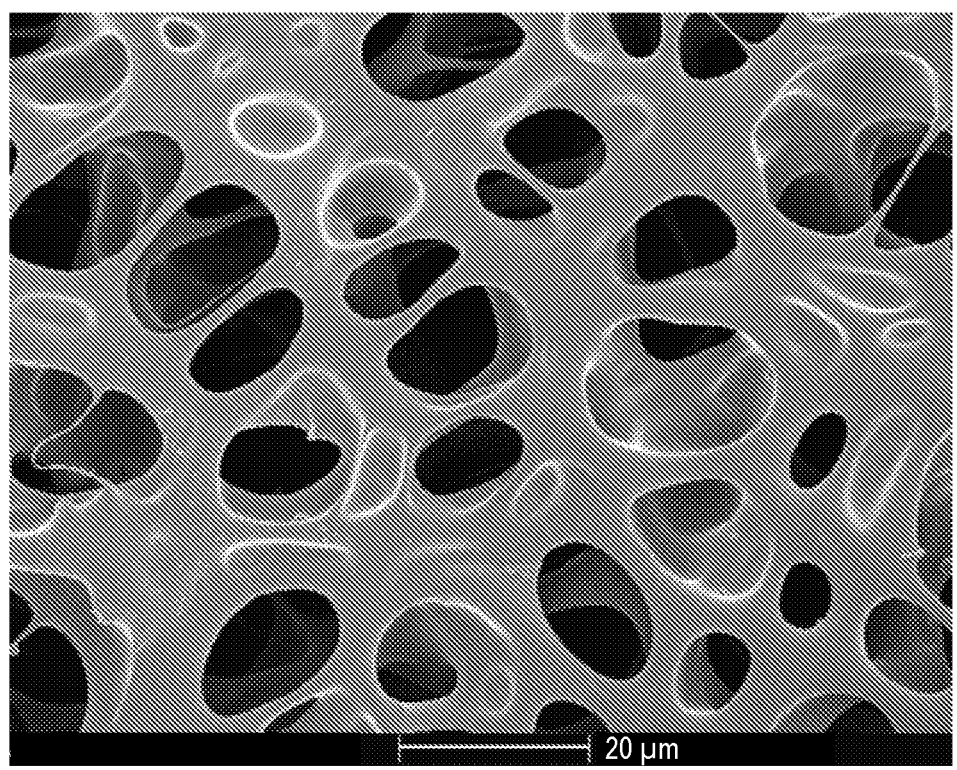
FIG. 1 depicts an SEM image of the top surface of the example composite produced in Example 1.

The following describes porous membranes and freestanding composites containing the porous membranes, for use in lead-acid batteries. "Freestanding" refers to a porous membrane or composite having sufficient mechanical properties to permit manipulation such as winding and unwinding in continuous sheet form for use in an energy storage device assembly. As discussed above, the porous membranes have first and second opposite major surfaces. Unitary, regularly-shaped and regularly-spaced protrusions are formed in the first major surface. For lead-acid battery separators, the protrusions can be ribs, dots, or other types of spacers and the remainder of the porous membrane can be at least a portion of the backweb of the separator. For lead-acid battery separators, the protrusions separate the backweb from adjacent electrodes upon assembly in a battery. The ribs can be continuous or discontinuous or combinations thereof. "Unitary" as used herein means the protrusions are part of the bulk structure of the porous membrane. "Regularly-shaped" refers to the protrusions having an intentional and non-random shape. "Regularly-shaped" includes intentional protrusions that have imperfections. "Regularly-spaced" refers to the protrusions having an intentional and non-random spacing relative to other protrusions. The spacing does not have to be constant to be "regular." For example, ribs radiating from a single area or swirling to a common area would be "regular."

One benefit of the disclosed porous membranes is that ribs can be formed in the first major surface with an orientation independent of the orientation of the manufacturing equipment. For example, when the porous membrane is manufactured as a continuous web, the orientation of the ribs does not have to be in the machine direction or the transverse direction. The ribs can be in any pattern. Accordingly, when two porous membranes are laminated together such that the first major surface of each porous membrane is outwardly facing, then the resulting composite can have ribs in any pattern, independent of each other.

The porous membrane includes a solution-cast three-dimensional polymer matrix defining interconnecting pores that provide overall first major surface-to-second major surface fluid permeability. The polymer matrix provides innate electrolyte-wettability to surfaces of the interconnecting pores. The porous membrane is preferably formed by non-solvent induced phase separation. The desired polymers of the polymer matrix are dissolved in at least one solvent to form a polymer dope solution. A thin layer of the polymer dope solution is cast on a surface, such as a grooved surface. Next, the thin layer of the polymer dope solution is exposed to a non-solvent until phase inversion occurs and polymer precipitates on the surface (i.e., the solvent passes into the coagulation bath while non-solvent penetrates the polymer solution causing it to precipitate as a porous solid). Exposure can be accomplished by immersing the thin layer in a bath of the non-solvent.

In the preferred embodiment, the porosity of the protrusions is the same as the porosity of the backweb. Likewise, if there is a porosity gradient in the bulk structure, then the porosity in the protrusions follows the same gradient. Similarly, the density of the protrusions is preferably the same as the density of the backweb. This can be achieved with non-solvent induced phase separation.

The porous membrane is preferably non-rigid. The polymer matrix includes at least one thermoplastic polymer, such as, for example, polysulfone (PS), polyethersulfone (PES), polyacrylonitrile (PAN), or polyvinylidene fluoride (PVDF) polymer. Generic polymer names used herein are understood to encompass derivatives of the polymer. Sulfone polymers are amorphous thermoplastics comprised of aromatic units separated with sulfone, isopropylidene, or ether groups. PES has a high concentration of sulfone groups in the polymer repeating unit and, thus, has high water absorption ability and hydrophilicity. Such polymers are readily formed into membranes with highly controllable pore size distribution, very high mechanical strength, stable at pH from 2-13, low levels of extractable and insoluble materials and global agency approvals.

Preferably, the polymers of the polymer matrix are selected so as to be innately wettable and resistant to both sulfuric acid and oxidation. The polymer matrix can include additional polymers to accomplish the innate wettability. The additional polymer can be hydrophilic and/or can function as a pore-forming agent, a structure-enhancing agent, wettability-enhancing agent, or combinations thereof. Preferably, the polymer matrix includes an additional hydrophilic polymer or copolymer that may assist with pore formation, such as PVP, PEG, PEO, carboxymethylcellulose, or combinations thereof. The ratio of the at least one additional polymer functioning as a wettability-enhancing agent to the other polymers in the polymer matrix is generally about 1:1 to about 1:10, about 1:1 to about 1:5, or about 1:1 to about 1:3 on a weight basis.

Additionally, polymer can be present that increases the structural integrity of the polymer matrix (i.e., structure-enhancing agent), such polyacrylic acid (PAA). Structure-enhancing agents can improve flexibility and flatness (i.e., lack of curl) of the membrane and promote freestanding characteristics in the membrane. Such additional polymer can make up about 0.1% to about 2.5%, about 0.2% to about 1.3%, about 0.3% to about 1.0%, or about 0.4% to about 0.7% of the polymer matrix, on a weight basis. PAA, for example, in the above quantities can facilitate formation of a porous membrane that is highly flexible and is free of visibly detectable wrinkles, warping, or curling.

Preferably, the polymer matrix is dissolved to a low enough concentration in the polymer dope solution to avoid formation of a surface skin during the non-solvent induced phase separation. For example, concentrations, such as about 5% to about 25%, about 5% to about 20%, or about 5% to about 15% on a weight-to-weight basis, can be used to limit surface skin formation. "Skin formation" is where the top surface of the thin film forms with reduced porosity or different pore size distribution than that of the bulk structure. Polymer concentration also plays a role in determining the membrane porosity generally. Increasing polymer concentration in the polymer dope solution leads to a higher fraction of polymer and consequently decreases average membrane porosity and pore size. The exposure time to the non-solvent can also impact skin formation and overall pore morphology.

Figure 5A:
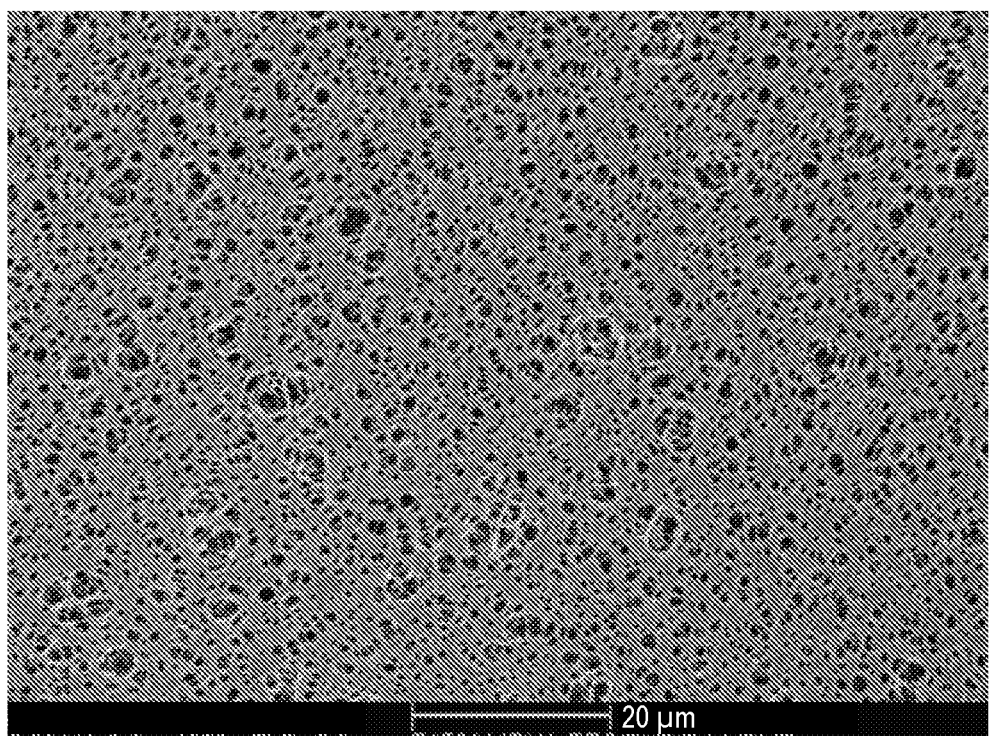
FIG. 5A depicts an SEM image of the top surface of the example composite produced in Example 9.

The polymer matrix can be dissolved in a number of solvents. The solvent must be miscible with the non-solvent. An aprotic polar solvent like N-methyl pyrrolidone (NMP), dimethyl formamide (DMF), dimethyl acetamide (DMAc) or dimethyl sulfoxide (DMSO) is preferable for rapid precipitation. FIG. 1 depicts an SEM image of an example polymer matrix formed using NMP as the solvent (see Example 1). FIG. 5A depicts an SEM image of an example polymer matrix formed using DMF as the solvent (see Example 9). In these examples, due to the faster rate of solvent exchange between water and DMF (compared to water and NMP) during the phase inversion/polymer precipitation step, smaller pores were formed when DMF was used as the solvent compared to when NMP was used.

The porous membrane can further include a filler with the polymer matrix, such as fibers, particles, or powders distributed throughout the bulk structure. Exemplary fillers include, but are not limited to, silica, alumina, titania, zirconia, glass, wood, carbon nanotubes, cellulose, lignin, lignosulphonate, chitosan, cross-linked rubber, and combinations thereof. For example, particulate fillers that function as a wetting agent can be dispersed throughout the pore structure of the multiple microporous webs, such as fumed silica or fumed alumina.

The porous membrane can further include a surfactant dispersed throughout the interconnecting pores of the polymer matrix, such as, an anionic surfactant, a non-ionic surfactant, or both.

The porous membranes can be formed on a substrate to provide a freestanding composite. The substrate is optionally, but preferably, part of the composite (e.g., at least partially embedded in the second major surface of the porous membrane). Depending on the density of the substrate, the polymer matrix can be formed primarily on the substrate or polymer matrix can surround individual fibers of the substrate. Examples of a substrate include a foam, a mat, a scrim, a sheet, a film, a web, a membrane, a non-woven, woven, or combination thereof.

Figure 2A:
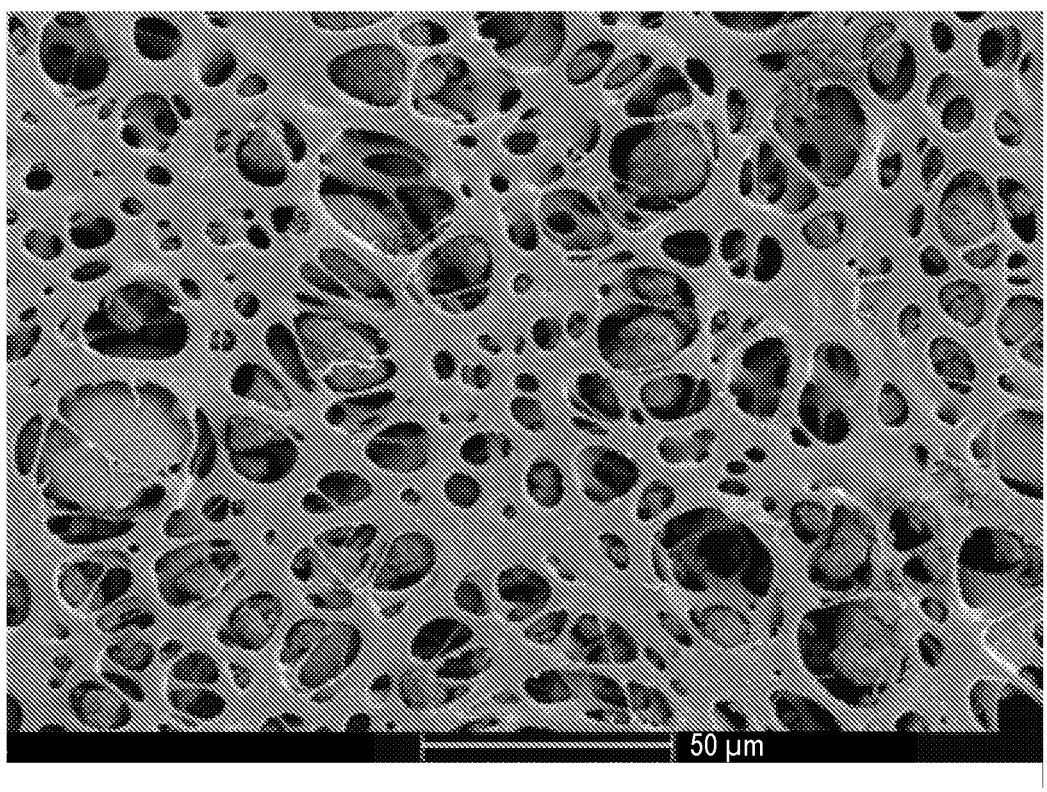
FIG. 2A depicts an SEM image of the top surface of the example composite produced in Example 2.
Figure 2B:
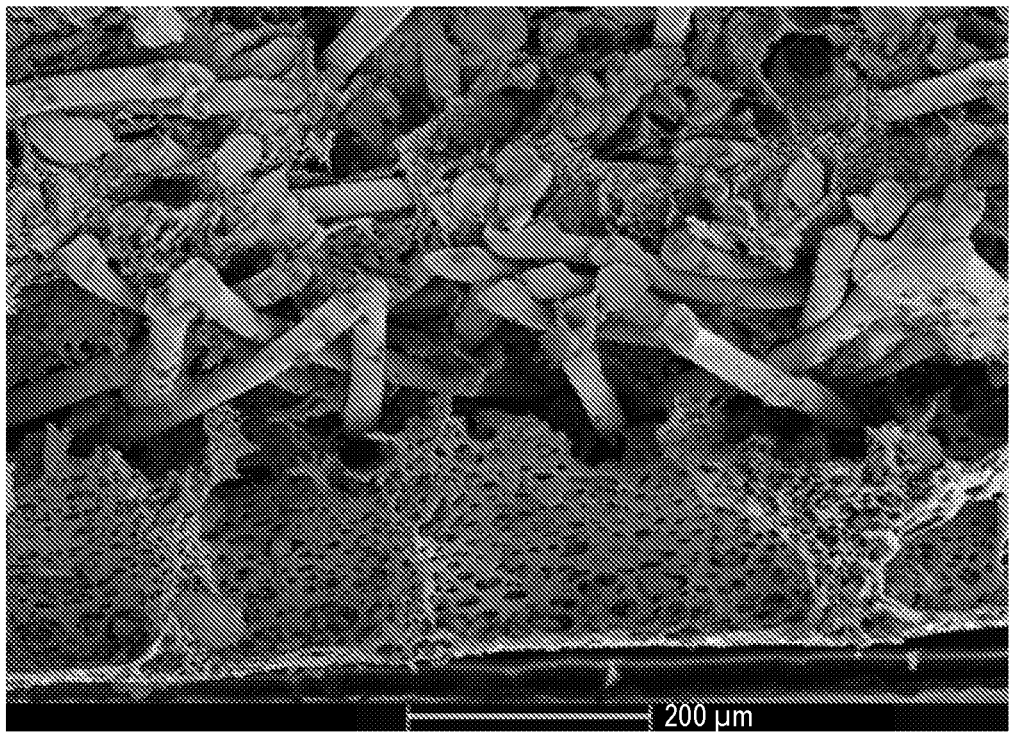
FIG. 2B depicts an SEM image of a cross-section of the example composite produced in Example 2.
Figure 2C:
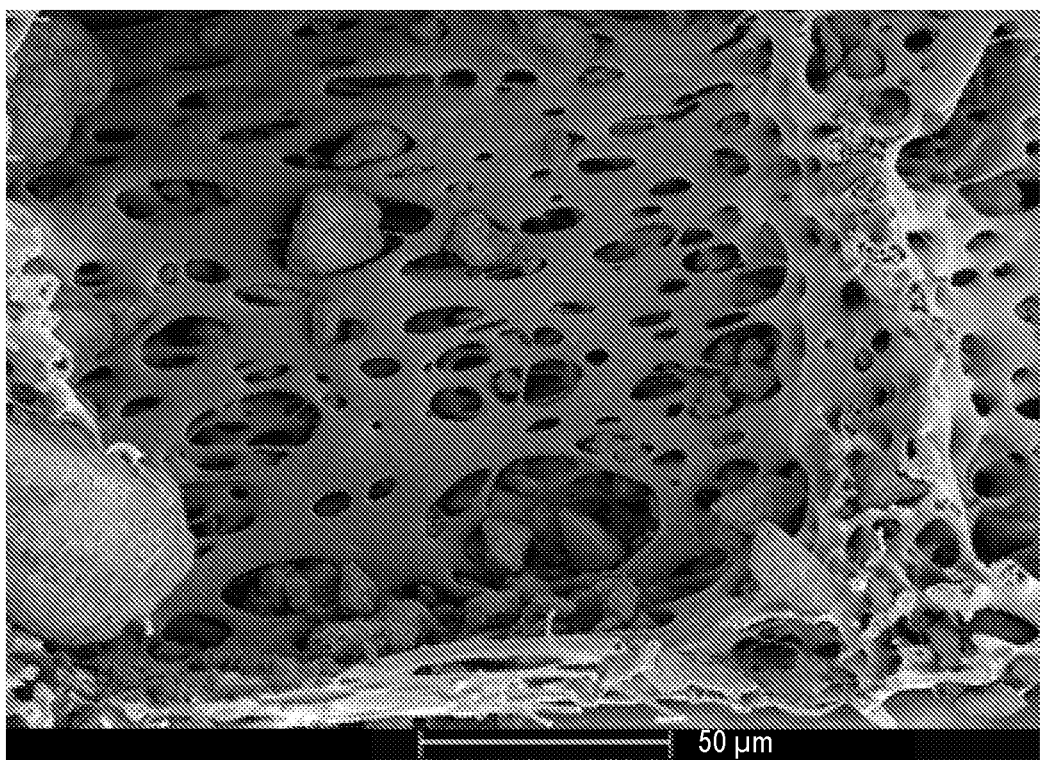
FIG. 2C depicts a further magnified SEM image of the same cross-section depicted in FIG. 2B.

FIG. 2A depicts an SEM image of a top surface (i.e., plate side and "first major surface") of an example composite made from a polymer dope solution containing 10 wt % PES and 10 wt % PVP and fumed silica (combined weight 10 wt %) that was applied to a PET non-woven substrate and phase inverted (see Example 2). FIGS. 2B & 2C depict SEM images of a cross-section of the same example. As can be seen in the images, there is an open pore structure filled with fumed silica from the surface throughout the X-section of the composite. The surface pores include silica particles and do not have a "surface-skin."

Figure 3A:
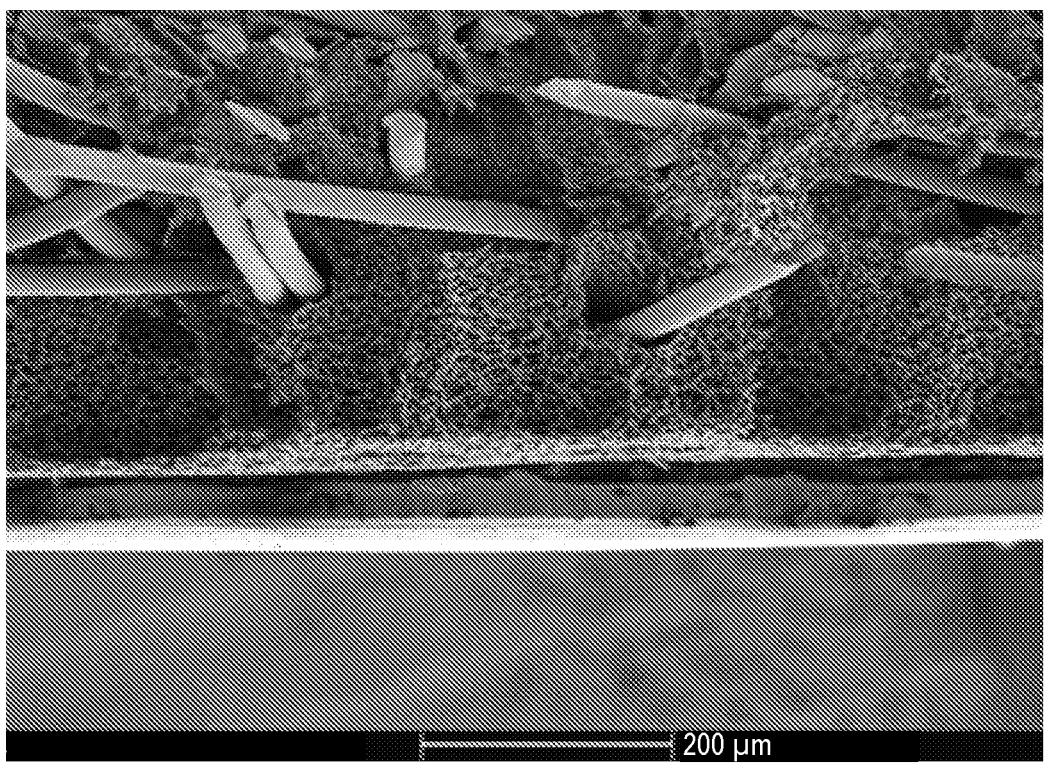
FIG. 3A depicts an SEM image of a cross-section of the example composite produced in Example 7.
Figure 3B:
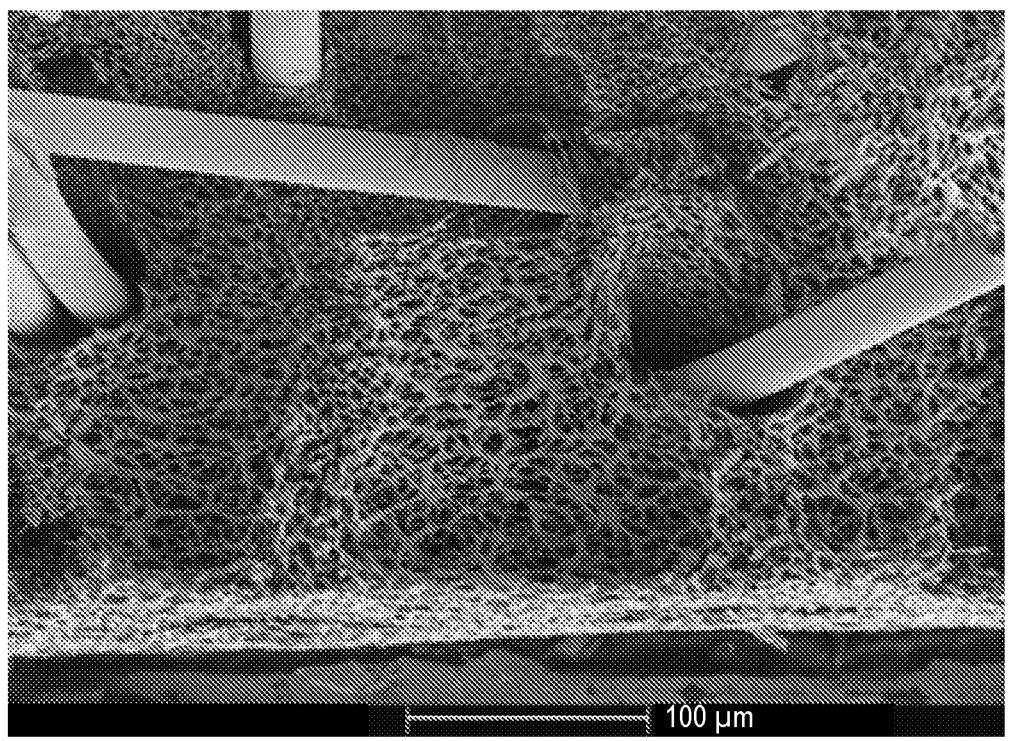
FIG. 3B depicts a further magnified SEM image of the same cross-section depicted in FIG. 3A.
Figure 4A:
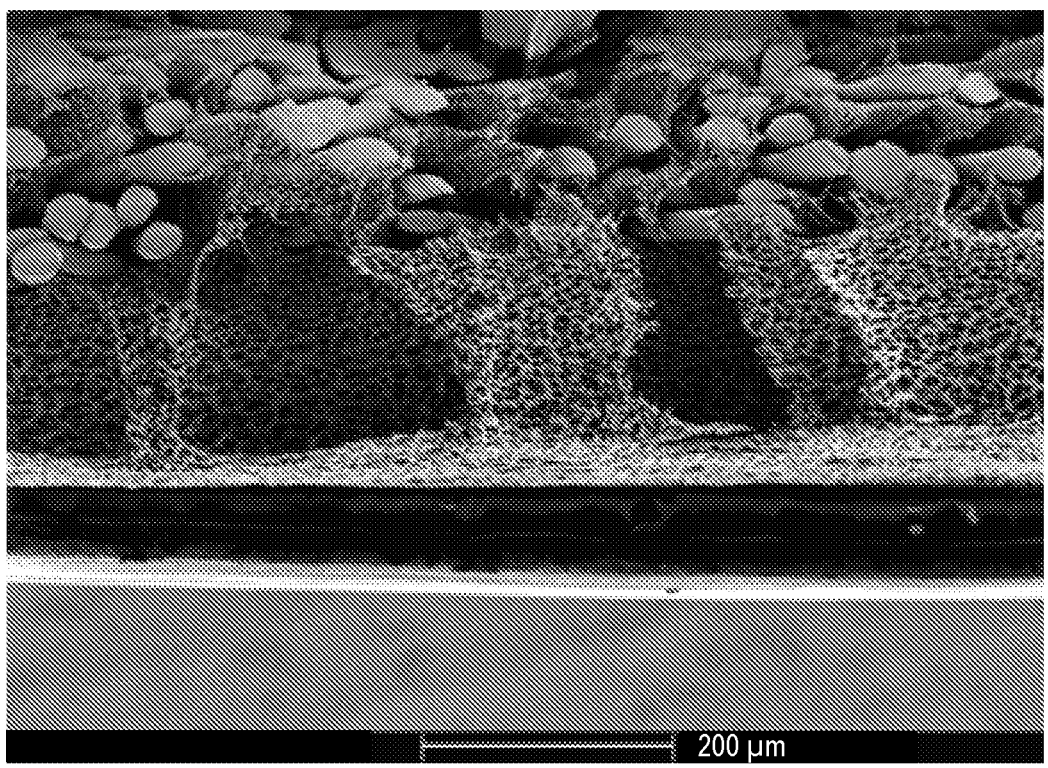
FIG. 4A depicts an SEM image of a cross-section of the example composite produced in Example 8.
Figure 4B:
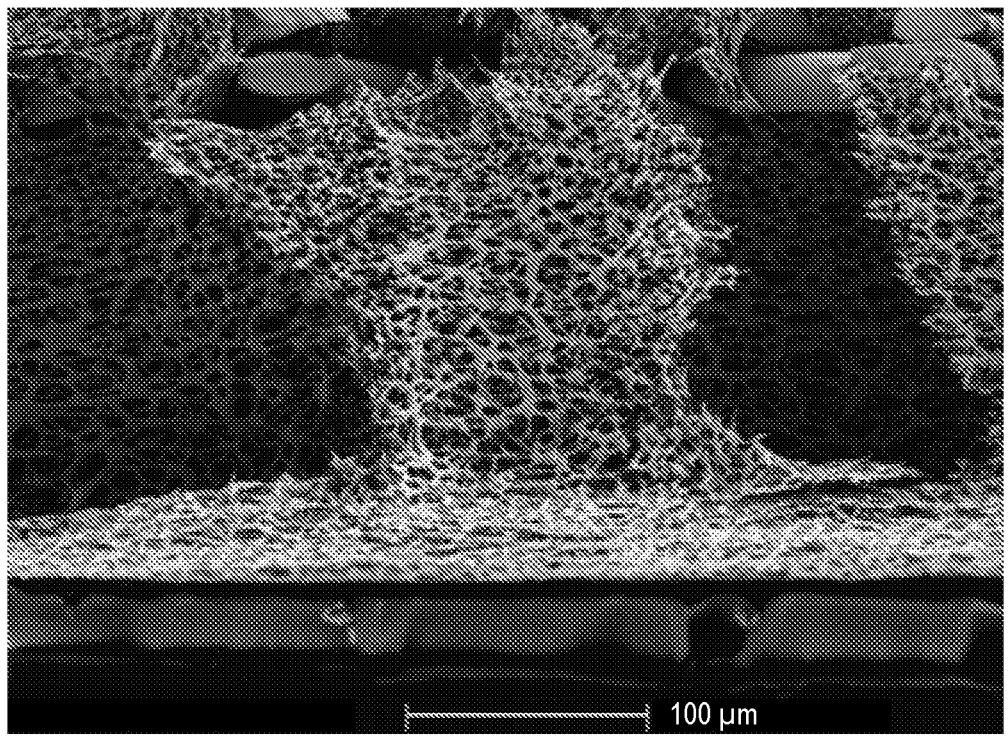
FIG. 4B depicts a further magnified SEM image of the same cross-section depicted in FIG. 4A.

FIGS. 3A & 3B depict a polymer matrix well embedded in a 50 grams per square meter (GSM) PET nonwoven substrate (see Example 7). FIGS. 4A & 4B depict a polymer matrix mostly on the surface of a 100 GSM PET nonwoven substrate (see Example 8).

Figure 5B:
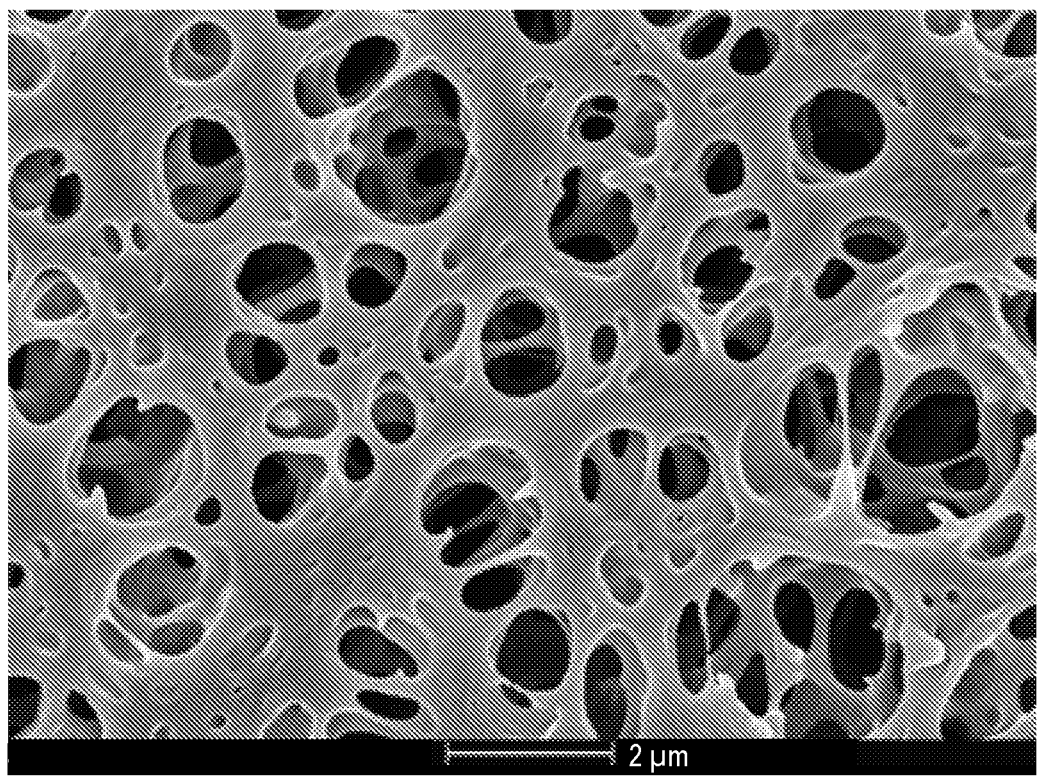
FIG. 5B depicts a further magnified SEM image of the same surface depicted in FIG. 5A.
Figure 5C:
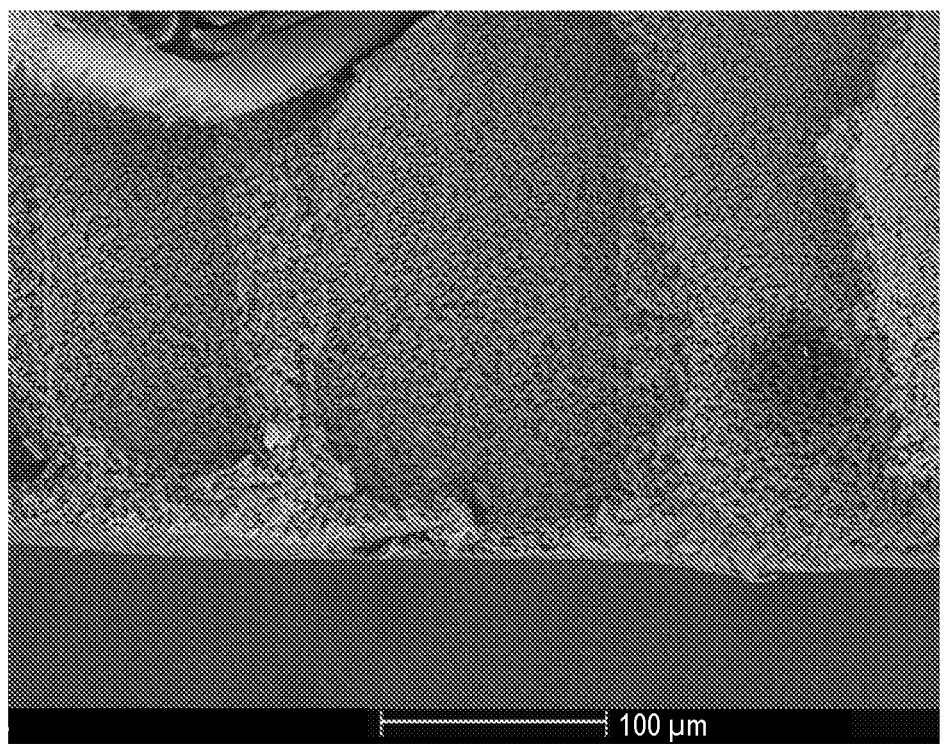
FIG. 5C depicts an SEM image of a cross-section of the example composite produced in Example 9.

FIGS. 5A & 5B depict SEM images of top surfaces (i.e., plate side and "first major surface") of an example composite made from a polymer dope solution containing 10 wt % PES and 10 wt % PVP and DMF as the solvent that was applied to a PET non-woven substrate and phase inverted (see Example 9). FIG. 5C depicts an SEM image of a cross-section of the same example. As can be seen in the images, there is an open pore structure from the surface throughout the X-section of the composite and surface pores show an absence of "surface-skin."

Figure 6A:
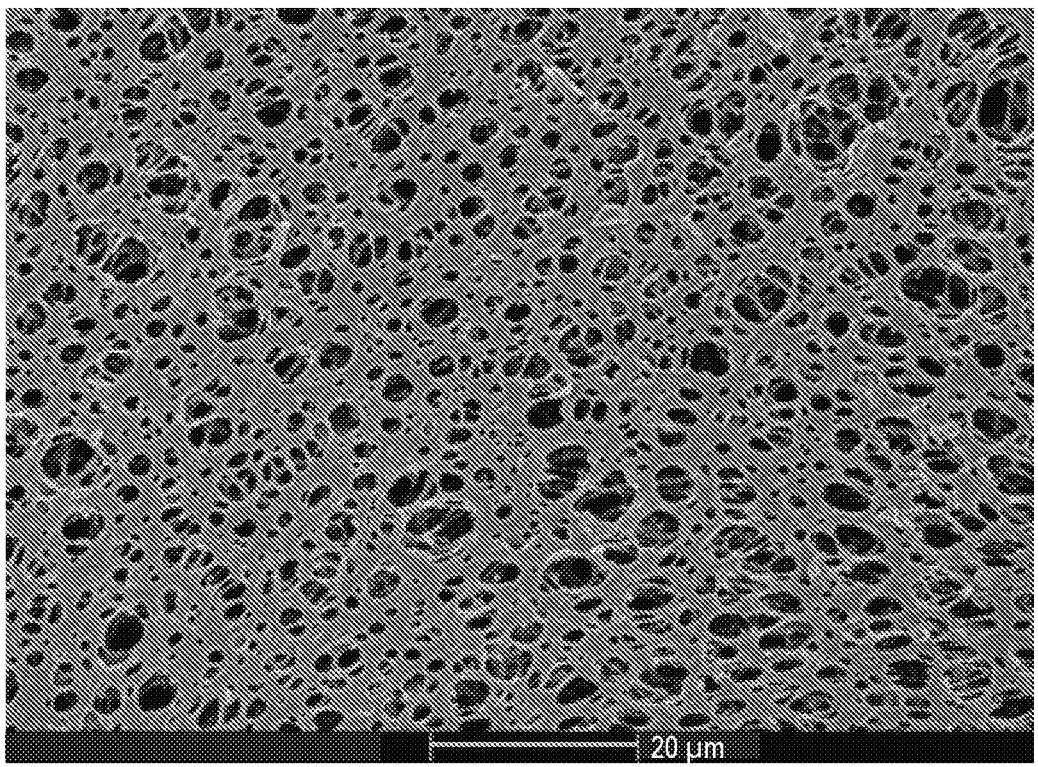
FIG. 6A depicts an SEM image of the top surface of the example composite produced in Example 10.
Figure 6B:
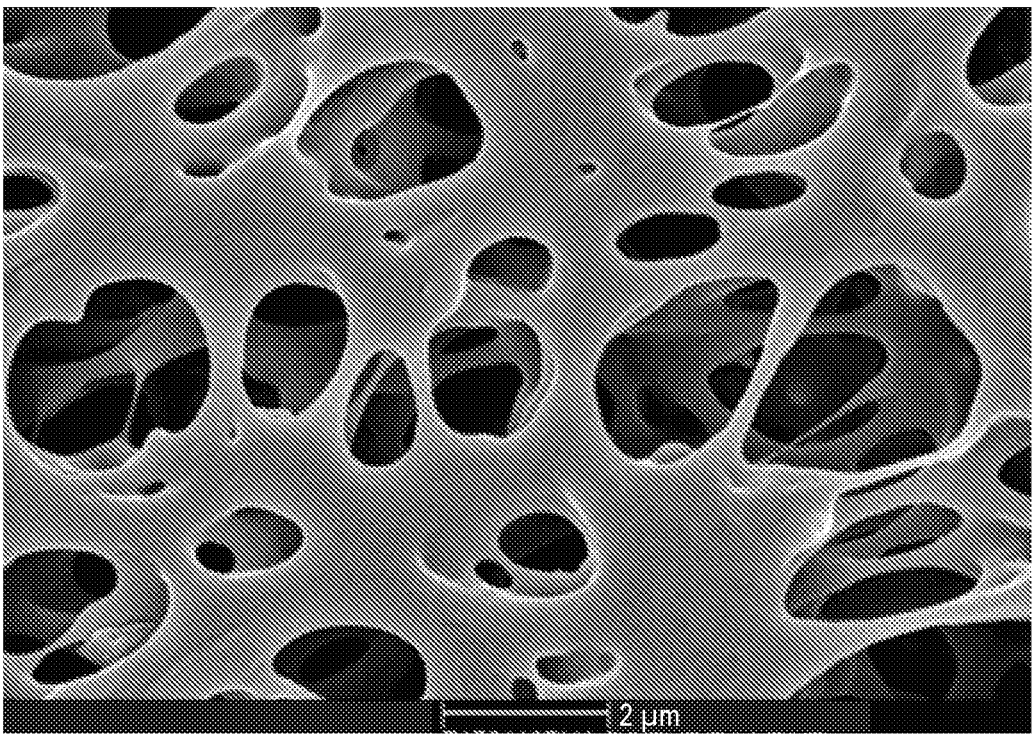
FIG. 6B depicts a further magnified SEM image of the same surface depicted in FIG. 6A.
Figure 6C:
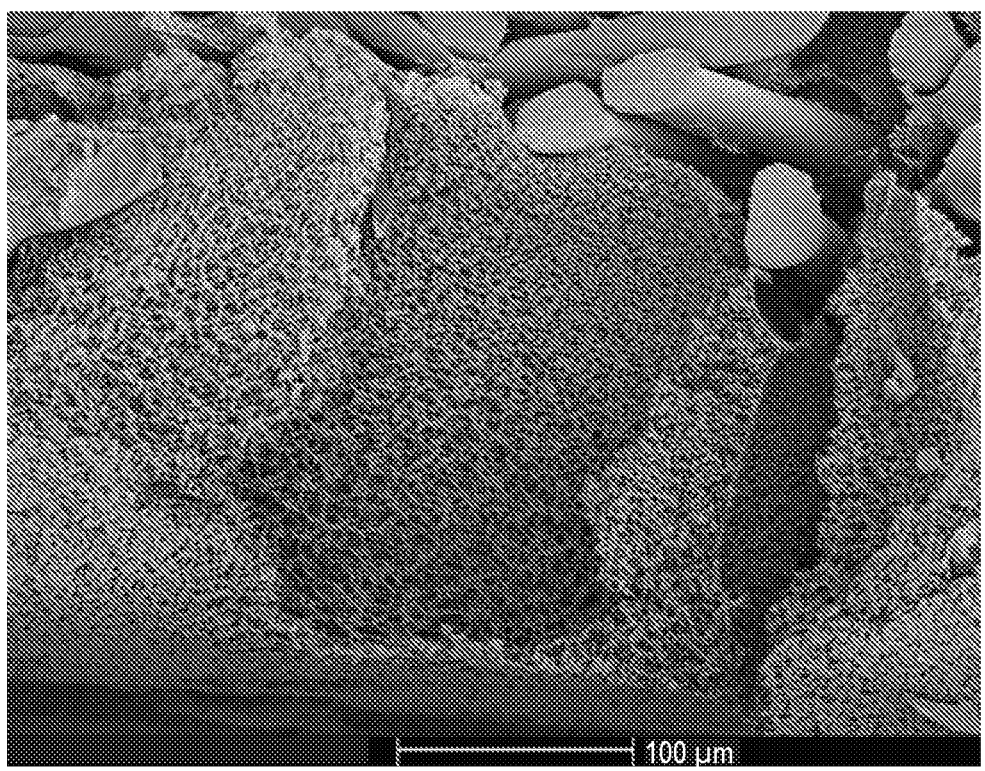
FIG. 6C depicts an SEM image of a cross-section of the example composite produced in Example 10.

FIGS. 6A & 6B depict SEM images of top surfaces (i.e., plate side and "first major surface") of an example composite made from a polymer dope solution containing 10 wt % PS and 10 wt % PVP and DMF as the solvent that was applied to a PET non-woven substrate and phase inverted (see Example 10). FIG. 6C depicts an SEM image of a cross-section of the same example. As can be seen in the images, there is an open pore structure from the surface throughout the X-section of the composite and surface pores show an absence of "surface-skin."

The porous membranes and composites containing a single porous membrane can be porously laminated together to form freestanding composites. The second major surface of a first membrane (or composite) can be porously laminated to the second major surface of a second membrane to provide overall first membrane first major surface-to-second membrane first major surface fluid permeability. "Porously laminated" refers to lamination that maintains fluid permeability between the membranes. This can allow for multiple unitary, regularly-shaped and regularly-spaced protrusions on each first major surface. For example, as discussed previously, different rib patterns can be formed on each first major surface.

Figure 7A:
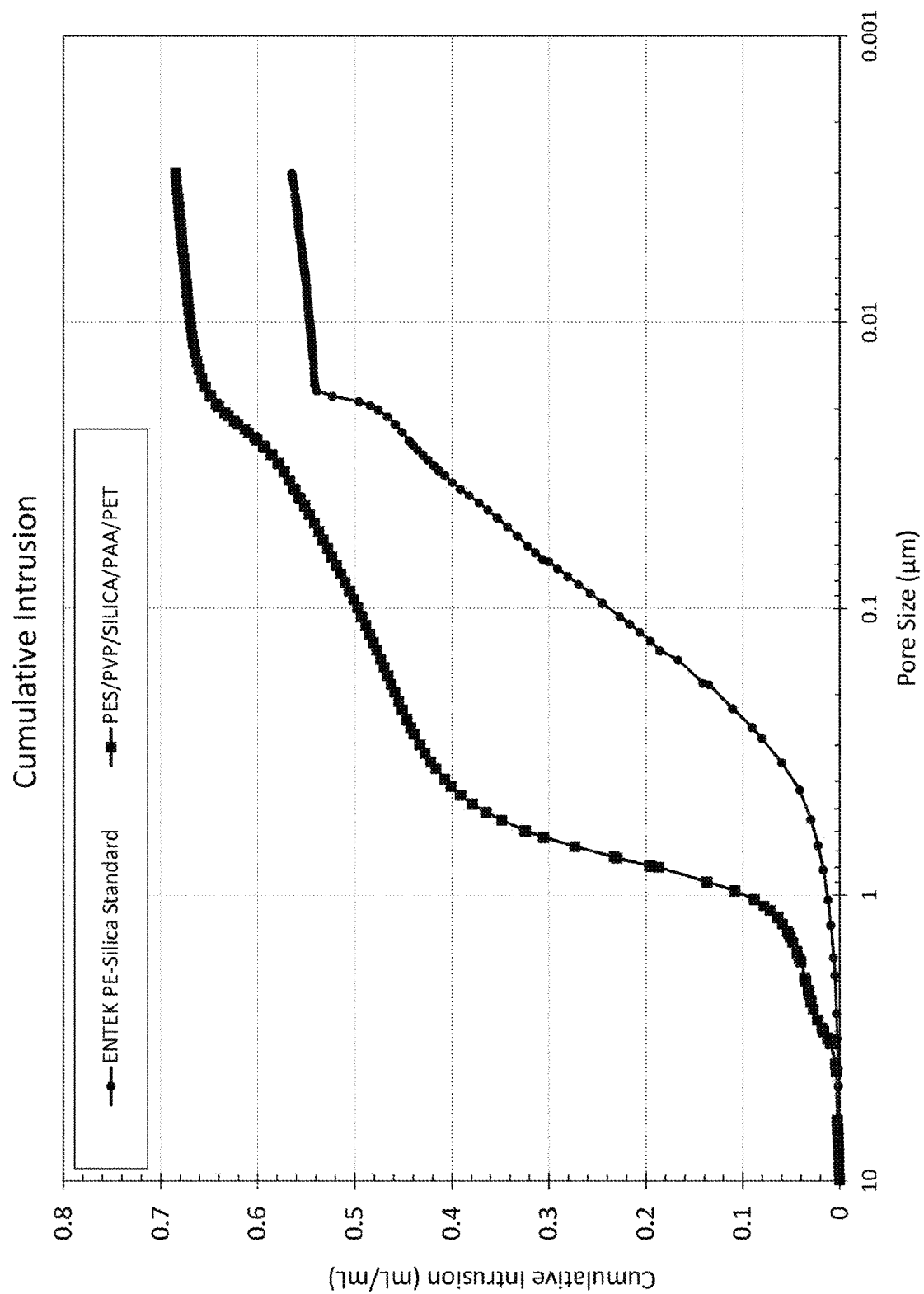
FIG. 7A illustrates cumulative pore volume versus pore diameter as determined by mercury porosimetry for the example composite produced by Example 11.
Figure 7B:
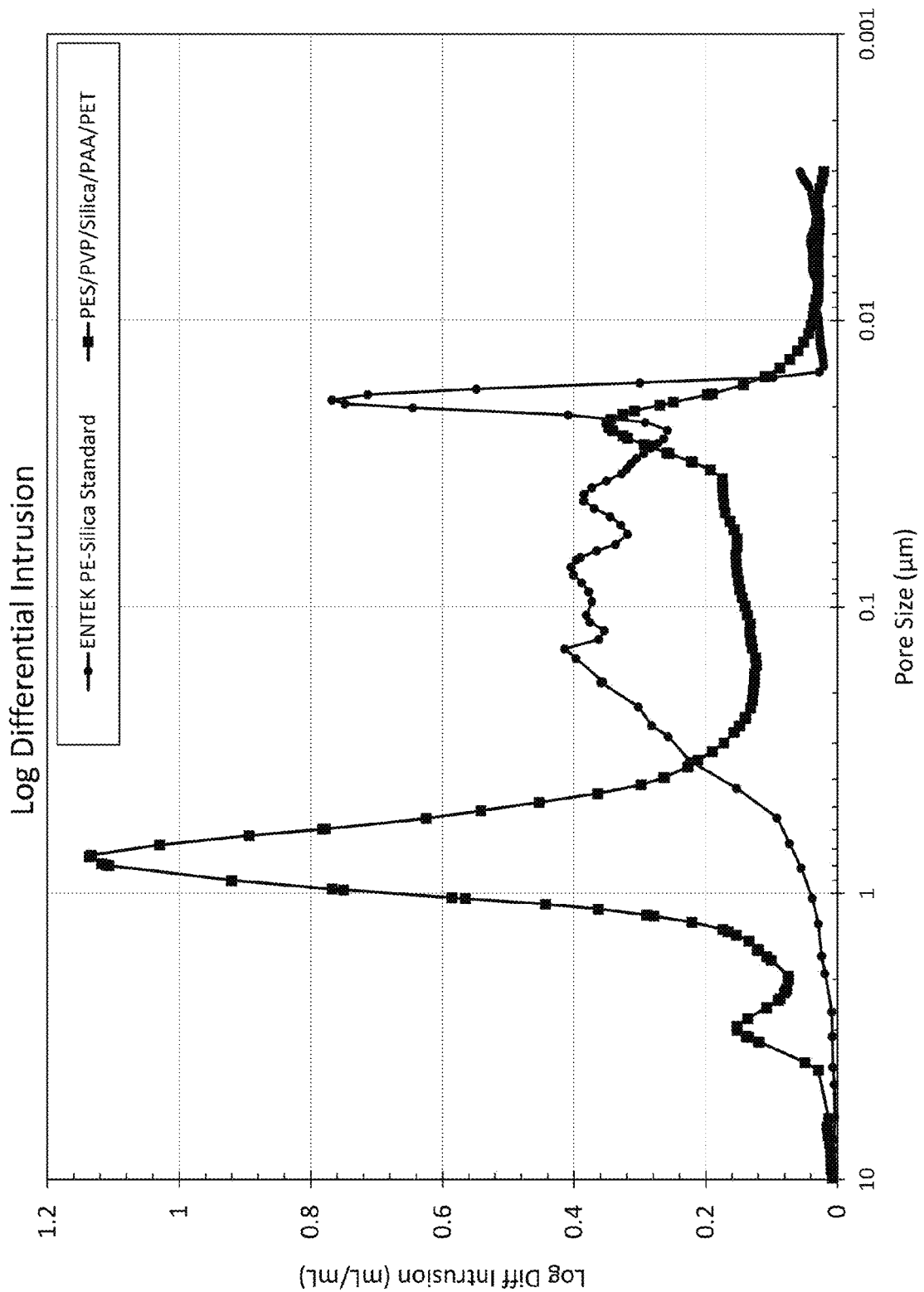
FIG. 7B illustrates the pore size distribution as determined by mercury porosimetry for the example composite produced by Example 11.

FIG. 7A illustrates the results of mercury porosimetry for an example composite two porous membranes laminated together (see Example 11) and each containing PES, PVP, and fumed silica with a PET non-woven substrate. FIG. 7A also illustrates a comparison to an ENTEK silica-filled polyolefin separator. The composite had a Hg porosity of 68%. The silica-filled polyolefin separator had a Hg porosity of 58%. FIG. 7B illustrates the pore size distribution of the same examples. The composite had a narrow pore size distribution. The spike in the silica-filled polyolefin separator is from the pores in the silica agglomerates.

Figure 8A:
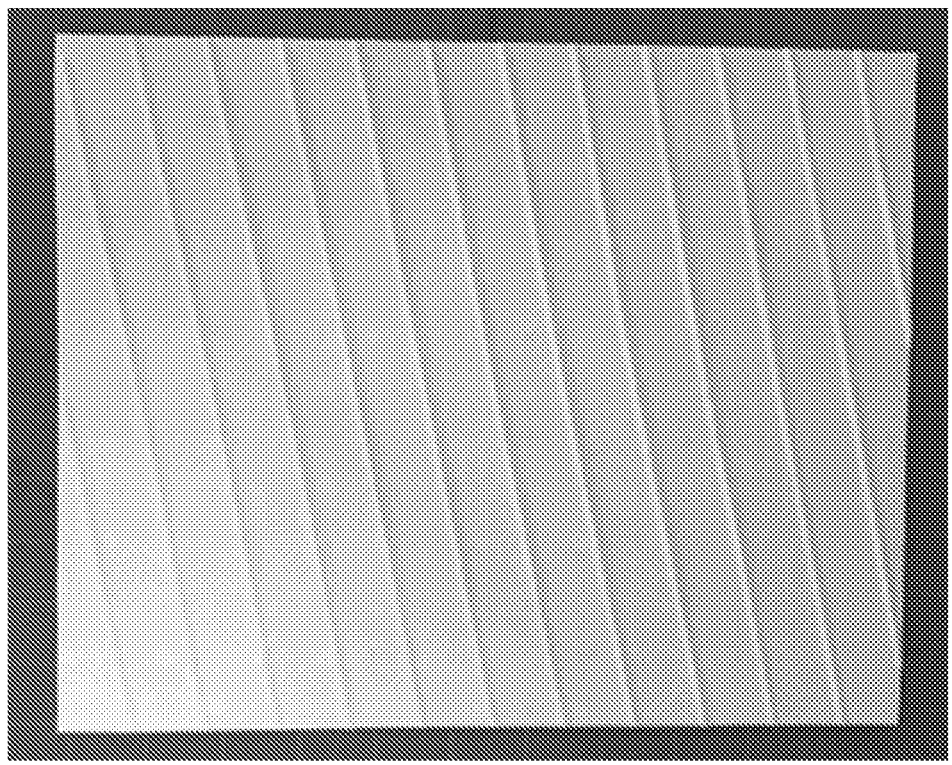
FIG. 8A depicts an image of the positive electrode side of the example composite produced by Example 11.
Figure 8B:
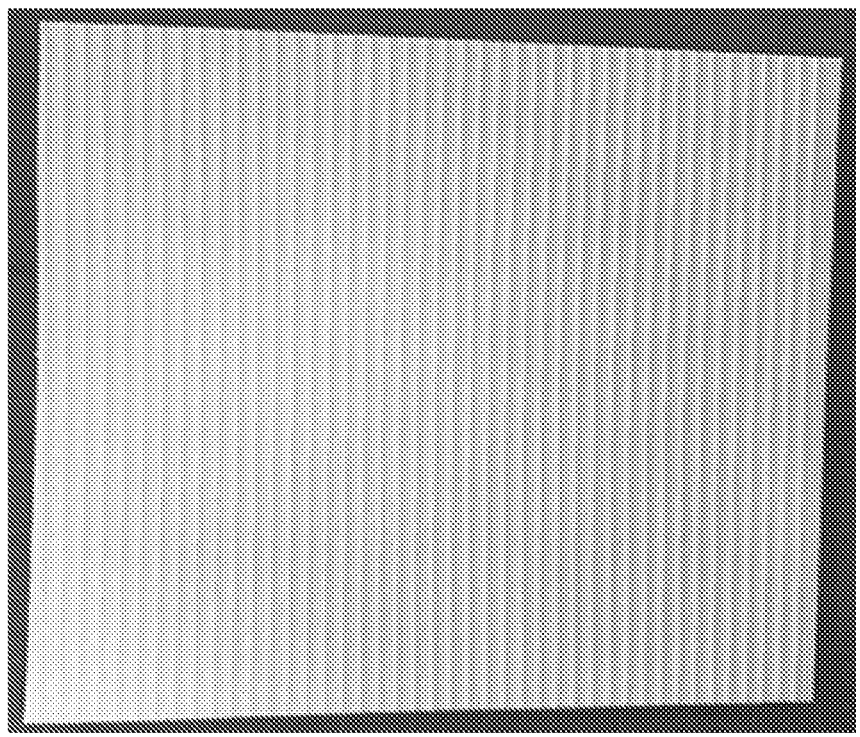
FIG. 8B depicts the negative electrode side of the example composite produced by Example 11.
Figure 8C:
FIG. 8C depicts a cross-section of the example composite produced by Example 11, with the positive electrode side oriented upward.
Figure 8D:
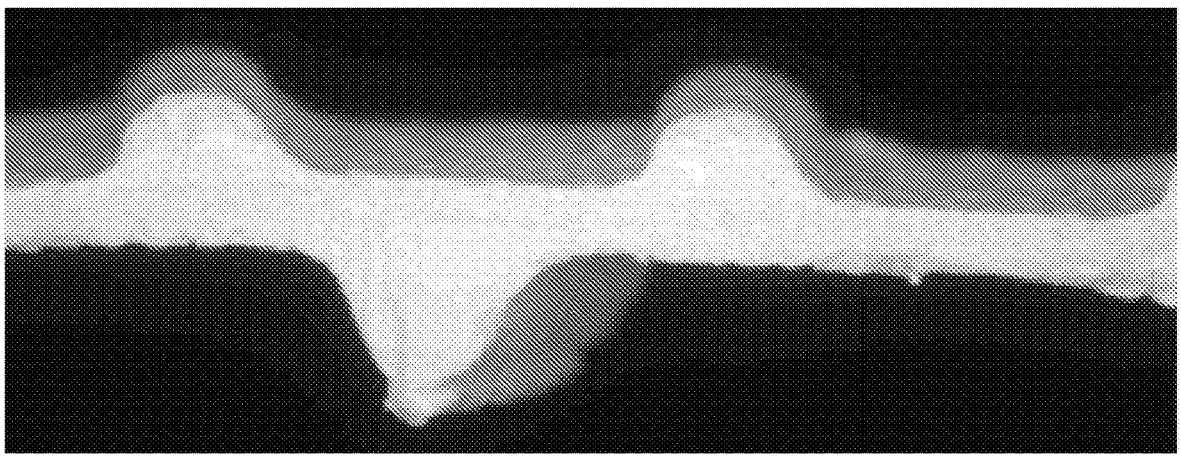
FIG. 8D depicts a cross-section of the example composite produced by Example 11, with the negative electrode side oriented upward.
Figure 9A:
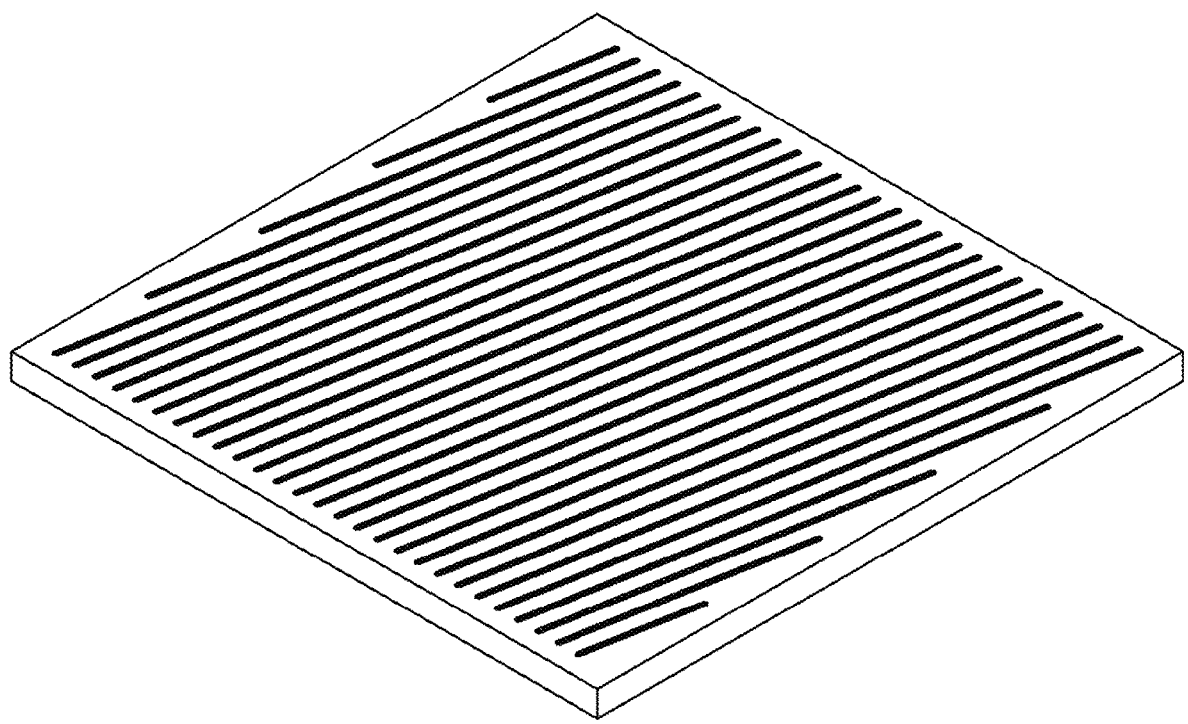
FIG. 9A illustrates the grooved plate used to form diagonal ribs on the positive electrode side of the composite produced in Example 11.
Figure 9B:
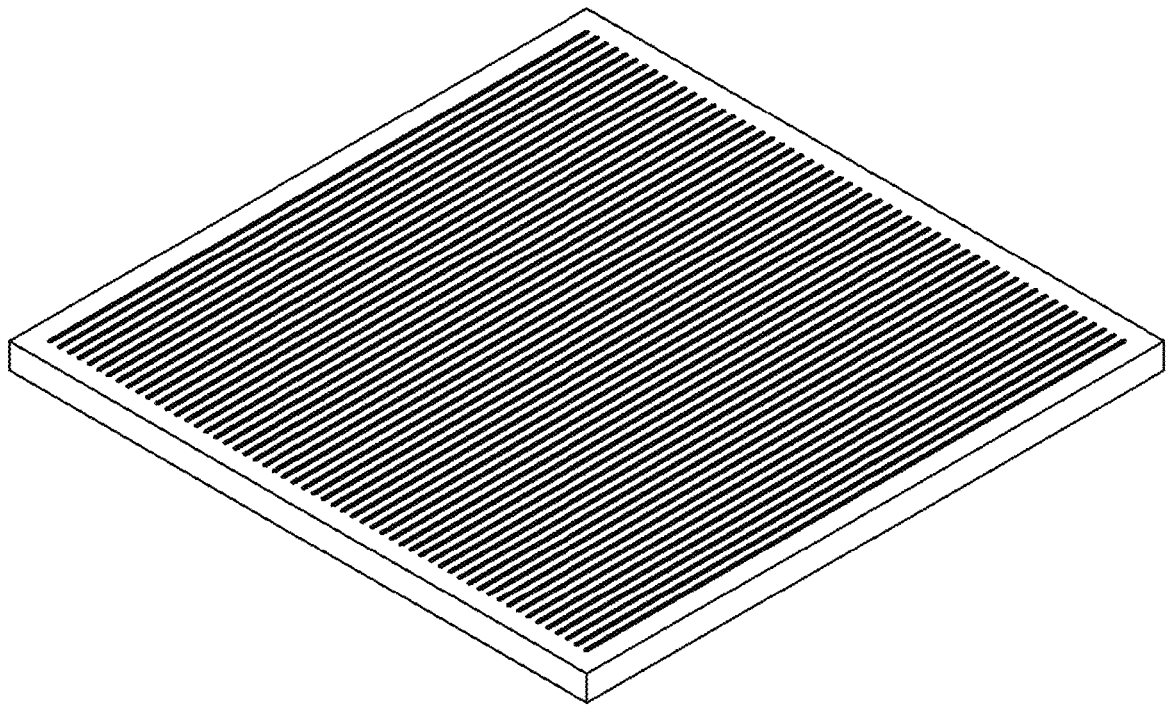
FIG. 9B illustrates the grooved plate used to form straight ribs on the negative electrode side of the composite produced in Example 11.

FIG. 8A depicts the composite produced by Example 11 with diagonal ribs on the positive electrode side. FIG. 8B depicts the same example with straight ribs on the negative electrode side. FIGS. 9A & 9B illustrate the plates used to form the composite depicted in FIGS. 8A & 8B.

As discussed previously, freestanding composites patterned on both sides can be made by providing a first cast film with a first rib pattern formed on a first major surface thereof and a smooth surface formed on a second major surface; providing a second cast film with a second rib pattern formed on a first major surface thereof and a smooth surface formed on a second major surface; and placing both of the second major surfaces together and applying heat and pressure. Manufacturing can further include rinsing, drying, annealing, or a combination thereof, the first and second membranes to complete formation of a single composite with patterns on both sides of the composite.

Figure 10A:
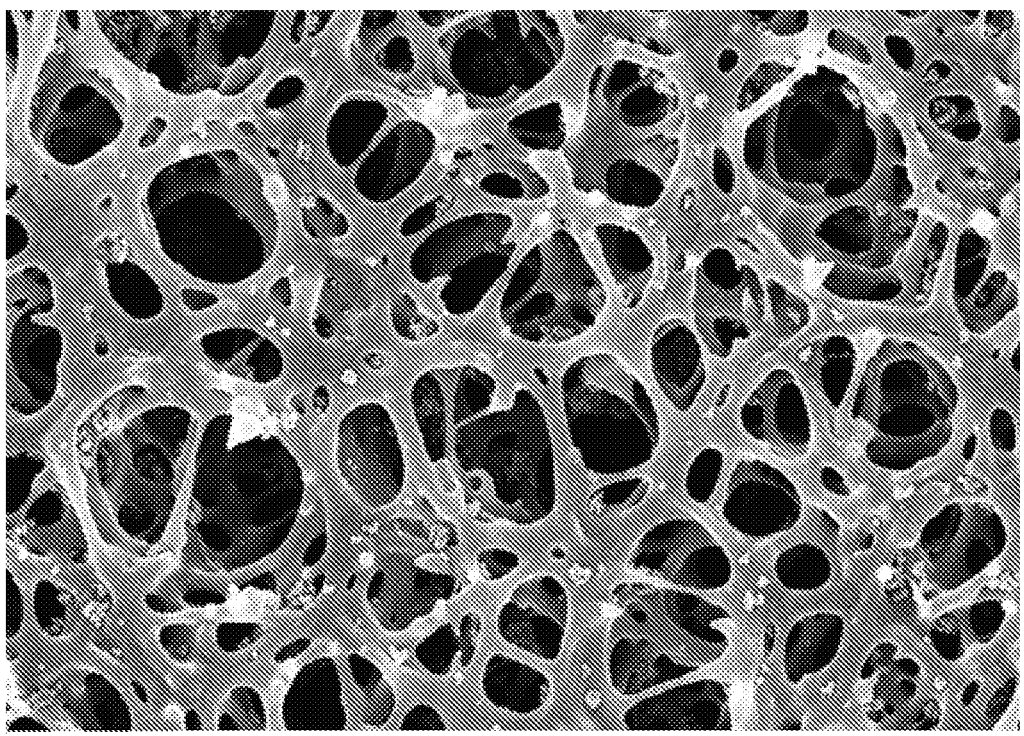
FIG. 10A depicts an SEM image of the top surface of the example porous membrane produced by Example 13.
Figure 10B:
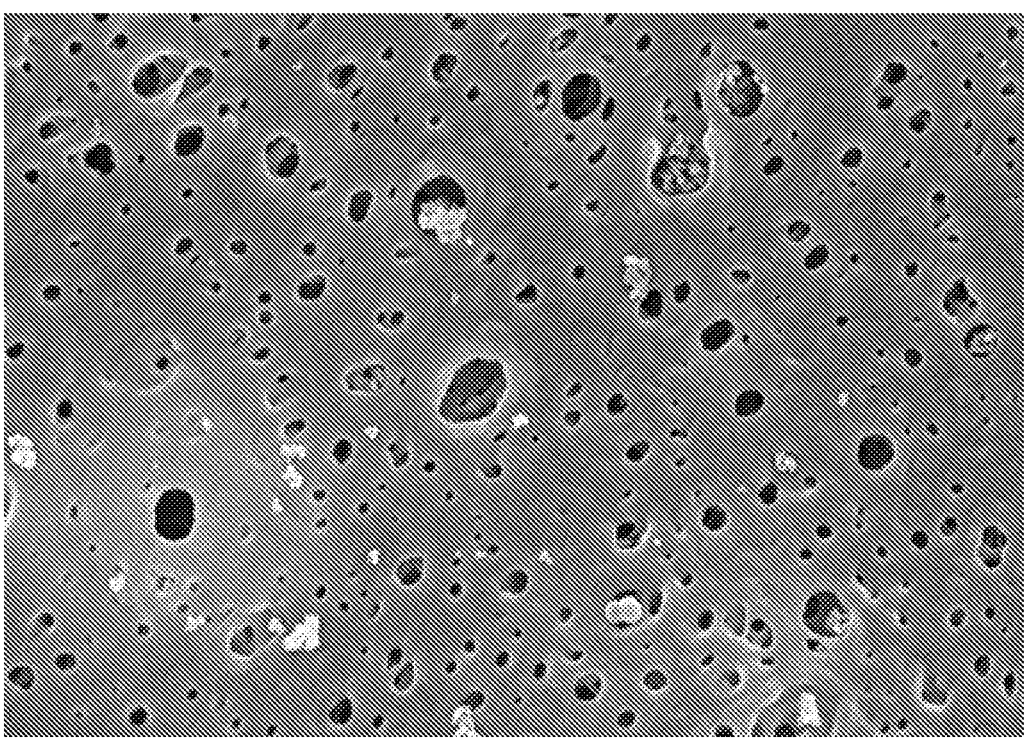
FIG. 10B depicts an SEM image of the top surfaces of the example porous membrane produced by Example 14.
Figure 11A:
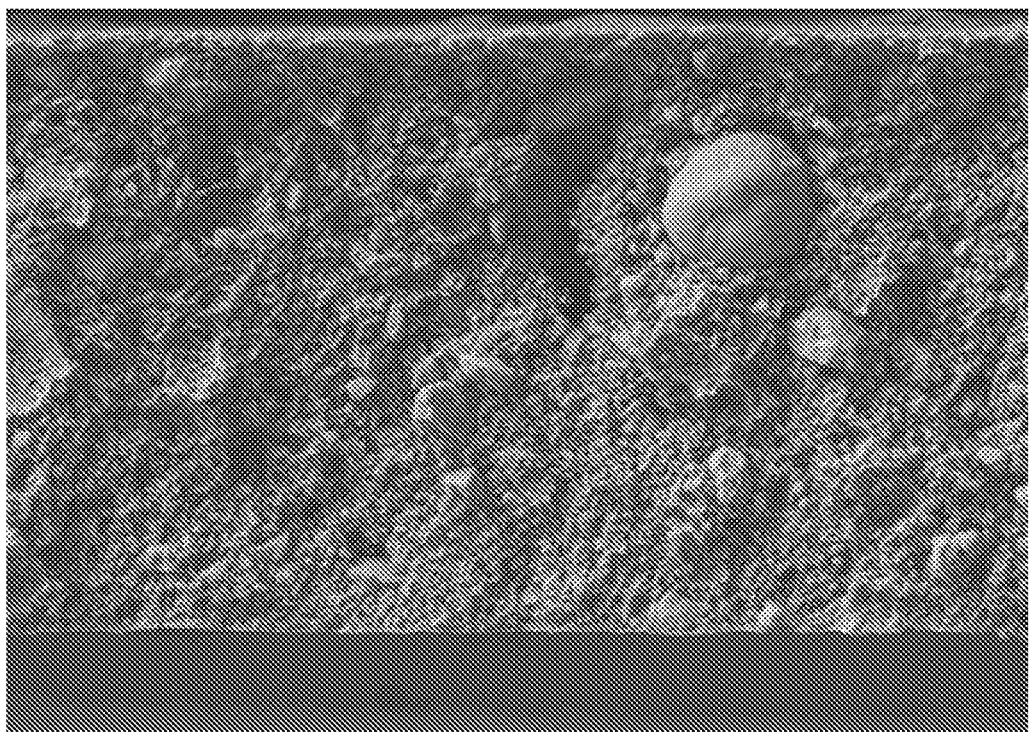
FIG. 11A depicts an SEM image of a cross-section of the example porous membrane produced by Example 13.
Figure 11B:
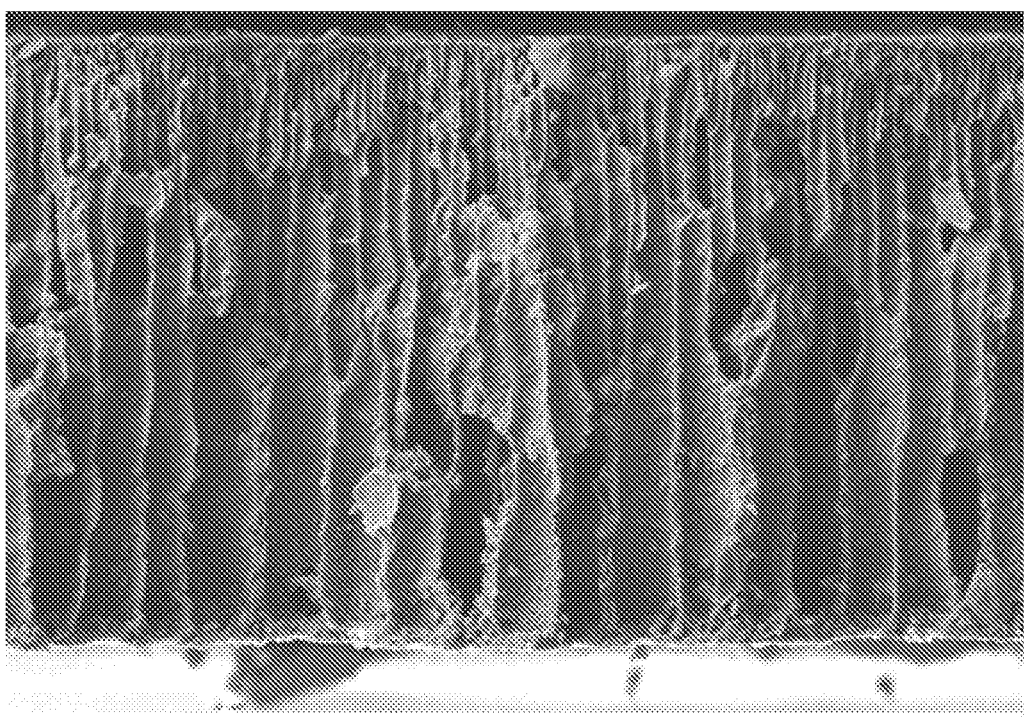
FIG. 11B depicts an SEM image of a cross-section of the example porous membrane produced by Example 14.

The presence or absence of a surfactant can impact the porosity of the porous membranes. FIG. 10A illustrates a top surface (i.e., plate side and "first major surface") of a porous membrane formed under a certain set of conditions and without a surfactant (see Example 13). FIG. 10B illustrates a top surface (i.e., plate side and "first major surface") of a porous membrane formed under the same set of conditions, but with a surfactant (see Example 14). Adding 5 wt % of surfactant to the polymer solution affected pore formation, leading to smaller and more uniform surface pores. FIGS. 11A & 11B illustrate cross-sections of the porous membranes produced in Examples 13 & 14, respectively. Addition of the surfactant led to the formation of finger-like voids running from the top surface to the bottom surface (i.e., second major surface), as compared to the spongy structure formed without surfactant.

Figure 12A:
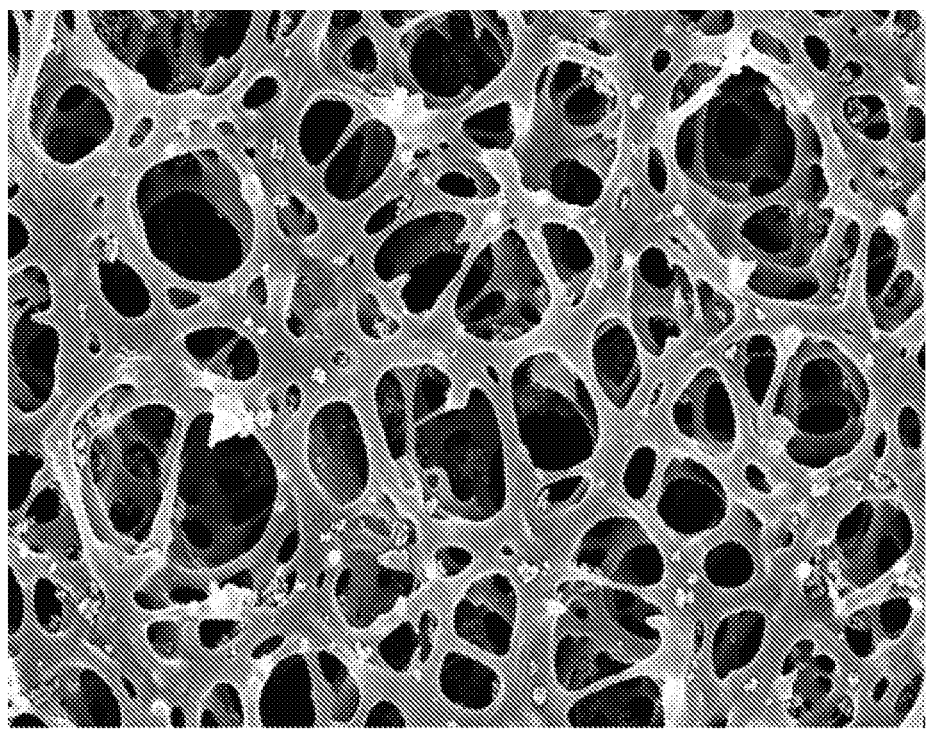
FIG. 12A depicts an SEM image of the top surface of the example porous membrane produced by Example 15.
Figure 12B:
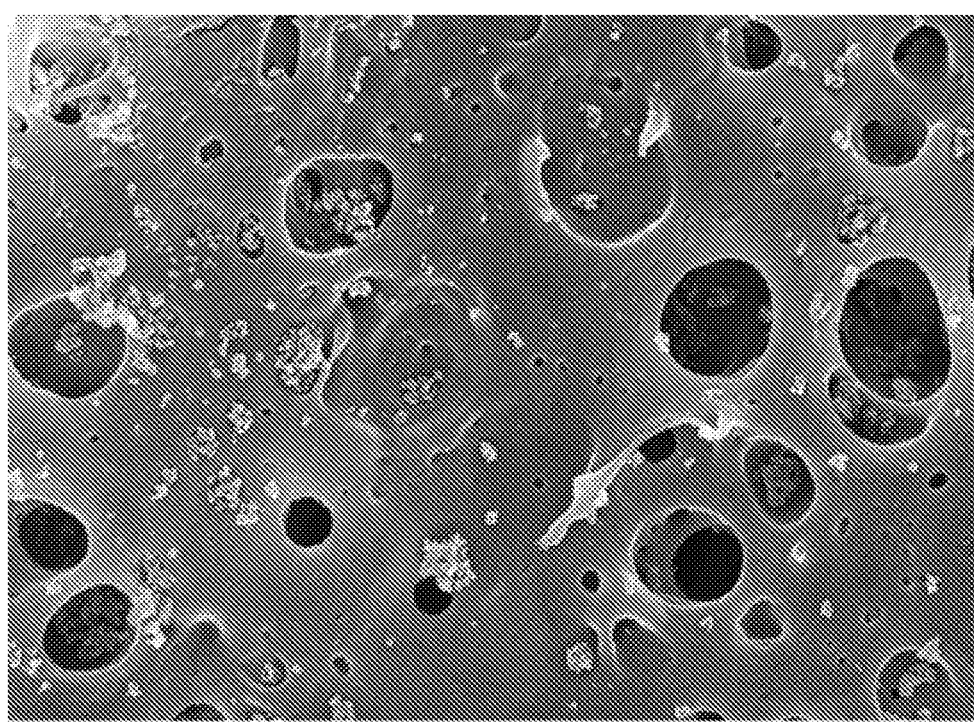
FIG. 12B depicts an SEM image of the top surface of the example porous membrane produced by Example 16.
Figure 12C:
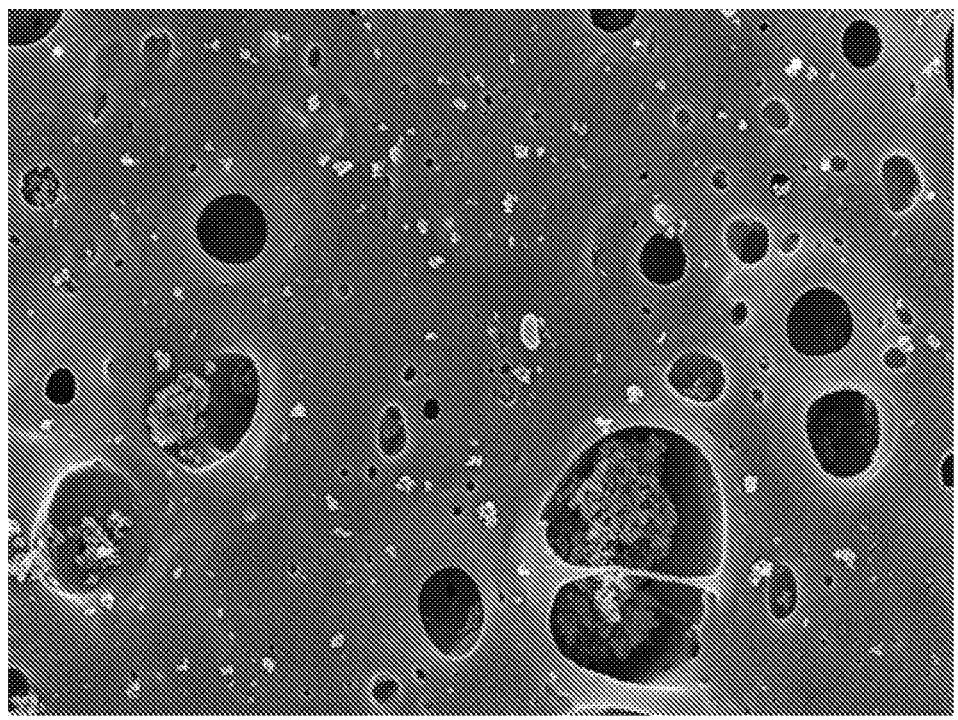
FIG. 12C depicts an SEM image of the top surface of the example porous membrane produced by Example 17.
Figure 13A:
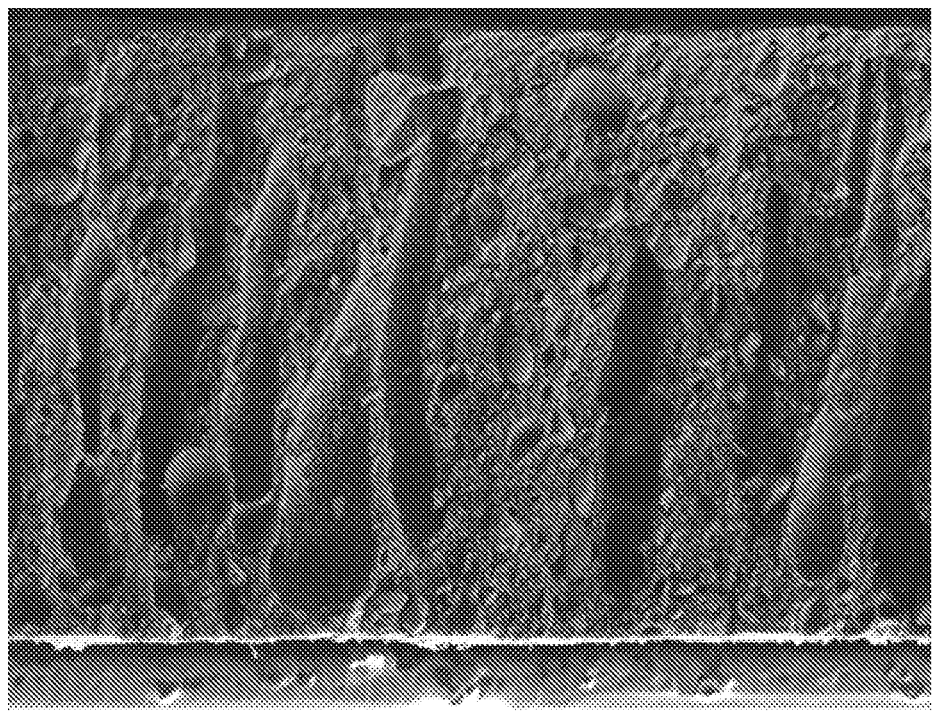
FIG. 13A depicts an SEM image of a cross-section of the example porous membrane produced by Example 15.
Figure 13B:
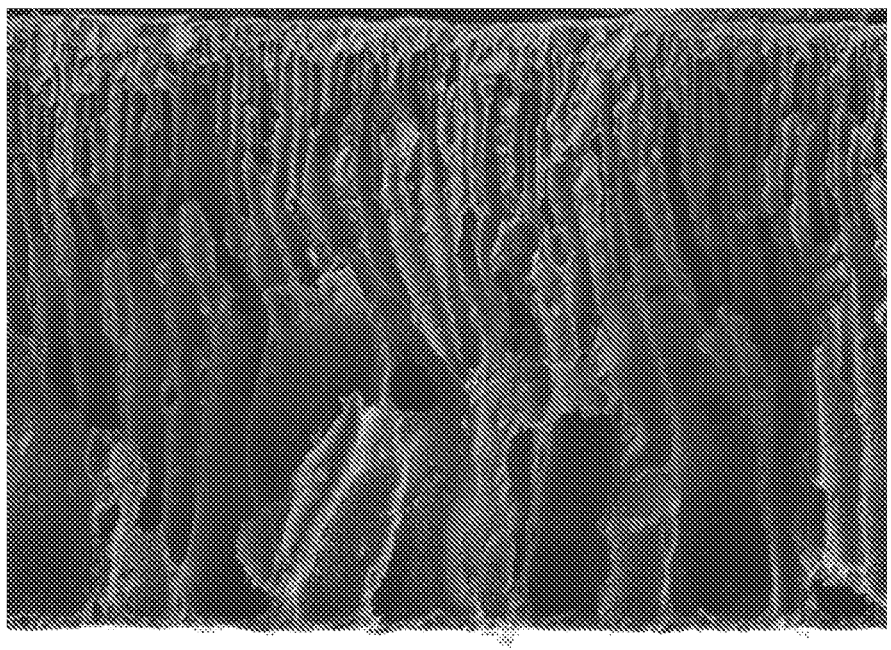
FIG. 13B depicts an SEM image of a cross-section of the example porous membrane produced by Example 16.
Figure 13C:
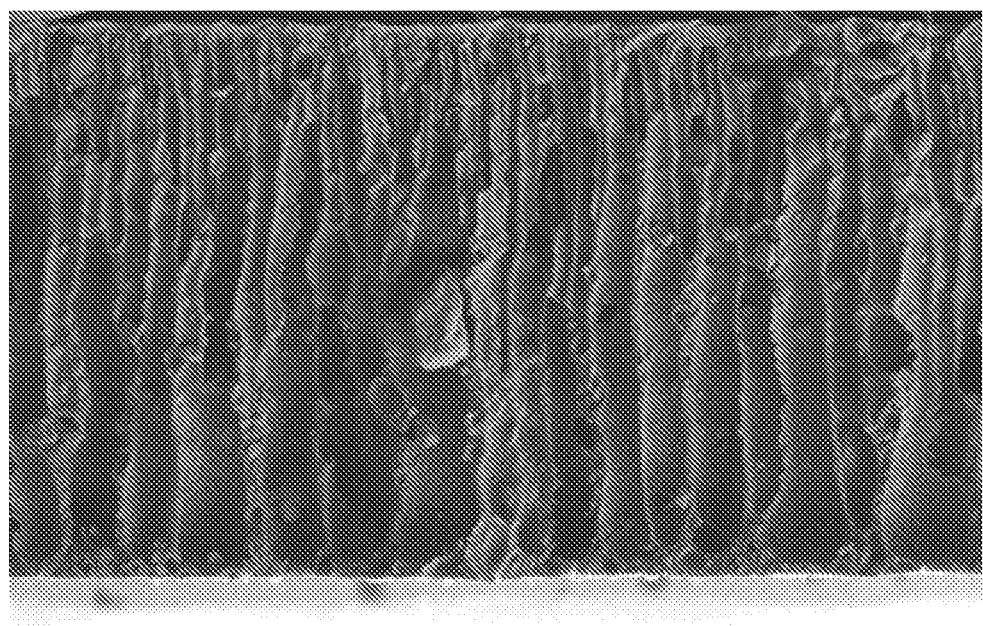
FIG. 13C depicts an SEM image of a cross-section of the example porous membrane produced by Example 17.

The coagulation bath temperature can impact the porosity of the porous membranes. FIGS. 12A, 12B, and 12C illustrate top surfaces (i.e., plate side and "first major surface") of porous membrane formed with the same formulation, but using coagulation bath temperatures of 20° C., 50° C., and 80° C., respectively (see Examples 15, 16, & 17, respectively). FIG. 10B illustrates a top surface (i.e., plate side and "first major surface") of a porous membrane formed under the same set of conditions, but with a surfactant (see Example 14). FIGS. 13A, 13B, and 13C illustrate cross-sections of the porous membranes produced in Examples 15, 16, and 17, respectively. Increasing temperature had similar impacts on surface pores and bulk structure pores as the presence of surfactant did.

As discussed previously, one benefit of the disclosed porous membranes and freestanding composites is that the porosity of the ribs can be the same as the porosity of the bulk structure. Additionally, the structural strength of the polymer matrix allows for tall ribs to be employed, if desired. For example, composites having an overall height (e.g., rib height) to backweb thickness ratio of up to 10:1 can be achieved.

Another benefit of the porous membranes and freestanding composites disclosed herein is that they can have a backweb puncture strength of about 6 to about 11 N/0.1 mm of backweb, which is greater than a phenolic separator (such as Daramic DARAK) or a silica-filled polyolefin separator (such as an ENTEK silica-filled polyolefin separator). Likewise, the porous membranes and freestanding composites disclosed herein can have a backweb tensile strength of about 10 MPa to about 25 MPa, which is greater than a phenolic separator (such as Daramic DARAK) or silica-filled polyolefin separator (such as an ENTEK silica-filled polyolefin separator).

At the same time, the porous membranes and freestanding composites disclosed herein can have a water porosity greater than 70%, about 60% to about 90%, about 70% to about 85%, or about 75% to about 85%. Additionally, the porous membranes and freestanding composites disclosed herein can have a median pore diameter of less than about 1 micron, of less than about 0.8 micron, of less than about 0.6 micron, of less than about 0.5 micron, of about 0.1 to about 0.9 micron, of about 0.2 to about 0.8 micron, or of about 0.3 to about 0.7 micron.

The acid-wettability, porosity and pore size distribution of the polymer matrix facilitates the porous membranes and freestanding composites disclosed herein having a normalized electrical resistance of about 5 to about 30 mOhm-cm$^2$/0.1 mm of backweb, of about 5 to about 15 mOhm-cm$^2$/0.1 mm of backweb, of about 5 to about 10 mOhm-cm$^2$/0.1 mm of backweb, of about 15 to about 30 mOhm-cm$^2$/0.1 mm of backweb, or of about 10 to about 25 mOhm-cm$^2$/0.1 mm of backweb.

A benefit of including additional hydrophilic polymers in the polymer matrix, is that if the polymer is water soluble (and water is the non-solvent for the principle thermoplastic polymer), then the additional hydrophilic polymer can function as a binder for laminating the two cast films together. Thus, the additional hydrophilic polymer (which can be about 10% to about 50% by weight of one or both of the cast films), such as PVP, can not only function as a pore-forming agent during precipitation of the porous membrane, but can serve as a binder to laminate two porous membranes together. Other potential binders include, but are not limited to, polyethylene glycol, polyvinyl alcohol, polyacrylic, polyacrylate (such as poly(methyl acrylates), polymethacrylates (such as poly(methyl methacrylates), natural gums (such as alginates), and polyacrylamide.

Preferably, the two porous membranes are laminated together while still saturated with non-solvent, such as water. Applying heat can involve heating the two cast films to about 40° C. to about 100° C., to about 60° C. to about 90° C., or to about 75° C. to about 85° C. Applying pressure can involve applying about 10 psi to about 300 psi to the two cast films (or an equivalent amount of pressure at the contact point between two rolls). Pressure can be applied by a press or as the films are passed between two heated rolls. The amount of binder impacts the pressure required to achieve lamination. At relatively high levels of binder, such as a 1:1 ratio of PVP to PES, relatively low pressure is required for lamination. At low levels of binder, such as a 1:10 ratio of PVP to PES, then relatively higher pressure is required for lamination.

A benefit of the methods disclosed herein is that the environmental considerations present when plasticizers or processing oils are used do not apply to the methods disclosed herein.

Additionally, the porous membranes and freestanding composites can have a clean white appearance and contain no residual plasticizer, process oil, or other components that could leach out and negatively impact the performance of the battery. Separators made with the porous membranes and freestanding composites disclosed herein could be ideal for stationary power batteries. Other energy storage devices could also benefit from such separators.

Additional advantages of the disclosed porous membranes and freestanding composites will be apparent from the totality of this disclosure.

Example 1

10 wt % polyethersulfone (Ultrason® E 6020, BASF Corporation), and 10 wt % polyvinylpyrrolidone (Luvitec® K 90, BASF Corporation) were added to 80 wt % N-methyl-2-pyrrolidone (ACS reagent, ≥99.0%, Sigma-Aldrich) under high shear mixing. The formulation was mixed for 5 hour with continuous heating to a temperature of 80° C. The dope solution was allowed to cool overnight after mixing. A film of the dope solution was cast on a flat, smooth aluminum plate using a BYK-Gardner 4304 Film Casting Knife with a 0.5 mm gap clearance and 8" blade width. A 100 g/m² 100% PET flat-calendared spunbond (Freudenberg Performance Materials) was placed over the cast film and embedded into the solution. The cast film with the embedded PET were immediately placed in a coagulation water bath at room temperature (~80° F.) for 10 minutes to allow film formation by phase inversion. The cast film was removed from the coagulation water bath and rinsed thoroughly with tap water for a minute to remove any residual solvent, removed from the plate, and then air dried at room temperature overnight. This film had a porosity of 68% and an electrical resistance of 18.88 mOhm-cm²/0.1 mm of thickness.

Example 2

10 wt % polyethersulfone (Ultrason® E 6020, BASF Corporation), 5 wt % polyvinylpyrrolidone (Luvitec® K 90, BASF Corporation) and 5 wt % precipitated silica (Zeosil® 1165MP, Solvay) were added to 80 wt % N-methyl-2-pyrrolidone (ACS reagent, ≥99.0%, Sigma-Aldrich) under high shear mixing. The formulation was mixed for 5 hour with continuous heating to a temperature of 80° C. The dope solution was allowed to cool overnight after mixing. A film of the dope solution was cast on a flat, smooth aluminum plate using a BYK-Gardner 4304 Film Casting Knife with a 0.5 mm gap clearance and 8" blade width. A 100 g/m² 100% PET flat-calendared spunbond (Freudenberg Performance Materials) was placed over the cast film and embedded into the solution. The cast film with the embedded PET were immediately placed in a coagulation water bath at room temperature (~80° F.) for 10 minutes to allow film formation by phase inversion. The cast film was removed from the coagulation water bath and rinsed thoroughly with tap water for a minute to remove any residual solvent, removed from the plate, and then air dried at room temperature overnight. This film had a porosity of 72.9% and an electrical resistance of 17.45 mOhm-cm²/0.1 mm of thickness.

Example 3

10 wt % polysulfone (Ultrason® S 6010, BASF Corporation), and 10 wt % polyvinylpyrrolidone (Luvitec® K 90, BASF Corporation) were added to 80 wt % N-methyl-2-pyrrolidone (ACS reagent, ≥99.0%, Sigma-Aldrich) under high shear mixing. The formulation was mixed for 5 hour with continuous heating to a temperature of 80° C. The dope solution was allowed to cool overnight after mixing. A film of the dope solution was cast on a flat, smooth aluminum plate using a BYK-Gardner 4304 Film Casting Knife with a 0.5 mm gap clearance and 8" blade width. A 100 g/m² 100% PET flat-calendared spunbond (Freudenberg Performance Materials) was placed over the cast film and embedded into the solution. The cast film with the embedded PET were immediately placed in a coagulation water bath at room temperature (~80° F.) for 10 minutes to allow film formation by phase inversion. The cast film was removed from the coagulation water bath and rinsed thoroughly with tap water for a minute to remove any residual solvent, removed from the plate, and then air dried at room temperature overnight. This film had a porosity of 72.1% and an electrical resistance of 11.34 mOhm-cm²/0.1 mm of thickness.

Example 4

10 wt % polysulfone (Ultrason® S 6010, BASF Corporation), 5 wt % polyvinylpyrrolidone (Luvitec® K 90, BASF Corporation) and 5 wt % precipitated silica (Zeosil® 1165MP, Solvay) were added to 80 wt % N-methyl-2-pyrrolidone (ACS reagent, ≥99.0%, Sigma-Aldrich) under high shear mixing. The formulation was mixed for 5 hour with continuous heating to a temperature of 80° C. The dope solution was allowed to cool overnight after mixing. A film of the dope solution was cast on a flat, smooth aluminum plate using a BYK-Gardner 4304 Film Casting Knife with a 0.5 mm gap clearance and 8" blade width. A 100 g/m² 100% PET flat-calendared spunbond (Freudenberg Performance Materials) was placed over the cast film and embedded into the solution. The cast film with the embedded PET were immediately placed in a coagulation water bath at room temperature (~80° F.) for 10 minutes to allow film formation by phase inversion. The cast film was removed from the coagulation water bath and rinsed thoroughly with tap water for a minute to remove any residual solvent, removed from the plate, and then air dried at room temperature overnight. This film had a porosity of 69.2% and an electrical resistance of 14.28 mOhm-cm²/0.1 mm of thickness.

Example 5

10 wt % polyvinylidene fluoride (Kynar® 301F, Arkema Inc.), and 10 wt % polyvinylpyrrolidone (Luvitec® K 90, BASF Corporation) were added to 80 wt % N-methyl-2-pyrrolidone (ACS reagent, ≥99.0%, Sigma-Aldrich) under high shear mixing. The formulation was mixed for 5 hour with continuous heating to a temperature of 80° C. The dope solution was allowed to cool overnight after mixing. A film of the dope solution was cast on a flat, smooth aluminum plate using a BYK-Gardner 4304 Film Casting Knife with a 0.5 mm gap clearance and 8" blade width. A 100 g/m² 100% PET flat-calendared spunbond (Freudenberg Performance Materials) was placed over the cast film and embedded into the solution. The cast film with the embedded PET were immediately placed in a coagulation water bath at room temperature (~80° F.) for 10 minutes to allow film formation by phase inversion. The cast film was removed from the coagulation water bath and rinsed thoroughly with tap water for a minute to remove any residual solvent, removed from the plate, and then air dried at room temperature overnight. This film had a porosity of 66.2% and an electrical resistance of 26.31 mOhm-cm²/0.1 mm of thickness.

Example 6

10 wt % polyvinylidene fluoride (Kynar® 301F, Arkema Inc.), 5 wt % polyvinylpyrrolidone (Luvitec® K 90, BASF Corporation) and 5 wt % precipitated silica (Zeosil® 1165MP, Solvay) were added to 80 wt % N-methyl-2-pyrrolidone (ACS reagent, ≥99.0%, Sigma-Aldrich) under high shear mixing. The formulation was mixed for 5 hour with continuous heating to a temperature of 80° C. The dope solution was allowed to cool overnight after mixing. A film of the dope solution was cast on a flat, smooth aluminum plate using a BYK-Gardner 4304 Film Casting Knife with a 0.5 mm gap clearance and 8" blade width. A 100 g/m² 100% PET flat-calendared spunbond (Freudenberg Performance Materials) was placed over the cast film and embedded into the solution. The cast film with the embedded PET were immediately placed in a coagulation water bath at room temperature (~80° F.) for 10 minutes to allow film formation by phase inversion. The cast film was removed from the coagulation water bath and rinsed thoroughly with tap water for a minute to remove any residual solvent, removed from the plate, and then air dried at room temperature overnight. This film had a porosity of 61.8% and an electrical resistance of 23.73 mOhm-cm²/0.1 mm of thickness.

Example 7

10 wt % polysulfone (Ultrason® S 6010, BASF Corporation), 10 wt % polyvinylpyrrolidone (Luvitec® K 90, BASF Corporation) and 0.1 wt % polyacrylic Acid (average $M_v$~1,250,000 (Aldrich)) were added to 79.9 wt % N-methyl-2-pyrrolidone (ACS reagent, ≥99.0%, Sigma-Aldrich) under high shear mixing. The formulation was mixed for 5 hour with continuous heating to a temperature of 80° C. The dope solution was allowed to cool overnight after mixing. A film of the dope solution was cast on a flat, smooth aluminum plate using a BYK-Gardner 4304 Film Casting Knife with a 0.5 mm gap clearance and 8" blade width. A 50 g/m² Evalith® Polyester spunbond (Johns Manville) was placed over the cast film and embedded into the solution. The cast film with the embedded PET were immediately placed in a coagulation water bath at room temperature (~80° F.) for 10 minutes to allow film formation by phase inversion. The cast film was removed from the coagulation water bath and rinsed thoroughly with tap water for a minute to remove any residual solvent, removed from the plate, and then air dried at room temperature overnight. This film had a porosity of 85.6% and an electrical resistance of 8.02 mOhm-cm²/0.1 mm of thickness.

Example 8

10 wt % polysulfone (Ultrason® S 6010, BASF Corporation), 10 wt % polyvinylpyrrolidone (Luvitec® K 90, BASF Corporation) and 0.1 wt % polyacrylic acid (average Mv~1,250,000 (Aldrich)) were added to 79.9 wt % N-methyl-2-pyrrolidone (ACS reagent, ≥99.0%, Sigma-Aldrich) under high shear mixing. The formulation was mixed for 5 hour with continuous heating to a temperature of 80° C. The dope solution was allowed to cool overnight after mixing. A film of the dope solution was cast on a flat, smooth aluminum plate using a BYK-Gardner 4304 Film Casting Knife with a 0.5 mm gap clearance and 8" blade width. A 100 g/m² 100% PET flat-calendared spunbond (Freudenberg Performance Materials) was placed over the cast film and embedded into the solution. The cast film with the embedded PET were immediately placed in a coagulation water bath at room temperature (~80° F.) for 10 minutes to allow film formation by phase inversion. The cast film was removed from the coagulation water bath and rinsed thoroughly with tap water for a minute to remove any residual solvent, removed from the plate, and then air dried at room temperature overnight. This film had a porosity of 77.0% and an electrical resistance of 13.30 mOhm-cm²/0.1 mm of thickness.

Example 9

10 wt % polyethersulfone (Ultrason® E 6020, BASF Corporation), 10 wt % polyvinylpyrrolidone (Luvitec® K 90, BASF Corporation), and 0.1 wt % polyacrylic acid (average Mv~1,250,000 (Aldrich)) were added to 79.9 wt % N,N-dimethylformamide (ACS reagent, ≥99.8%, Sigma-Aldrich) under high shear mixing. The formulation was mixed for 5 hour with continuous heating to a temperature of 80° C. The dope solution was allowed to cool overnight after mixing. A film of the dope solution was cast on a flat, smooth aluminum plate using a BYK-Gardner 4304 Film Casting Knife with a 0.5 mm gap clearance and 8" blade width. A 100 g/m² 100% PET flat-calendared spunbond (Freudenberg Performance Materials) was placed over the cast film and embedded into the solution. The cast film with the embedded PET were immediately placed in a coagulation water bath at room temperature (~80° F.) for 10 minutes to allow film formation by phase inversion. The cast film was removed from the coagulation water bath and rinsed thoroughly with tap water for a minute to remove any residual solvent, removed from the plate, and then air dried at room temperature overnight. This film had a porosity of 68% and an electrical resistance of 18.88 mOhm-cm²/0.1 mm of thickness.

Example 10

10 wt % polysulfone (Ultrason® S 6010, BASF Corporation), 10 wt % polyvinylpyrrolidone (Luvitec® K 90, BASF Corporation), and 0.1 wt % polyacrylic acid (average Mv~1,250,000 (Aldrich)) were added to 79.9 wt % N,N-dimethylformamide (ACS reagent, ≥99.8%, Sigma-Aldrich) under high shear mixing. The formulation was mixed for 5 hour with continuous heating to a temperature of 80° C. The dope solution was allowed to cool overnight after mixing. A film of the dope solution was cast on a flat, smooth aluminum plate using a BYK-Gardner 4304 Film Casting Knife with a 0.5 mm gap clearance and 8" blade width. A 100 g/m² 100% PET flat-calendared spunbond (Freudenberg Performance Materials) was placed over the cast film and embedded into the solution. The cast film with the embedded PET were immediately placed in a coagulation water bath at room temperature (~80° F.) for 10 minutes to allow film formation by phase inversion. The cast film was removed from the coagulation water bath and rinsed thoroughly with tap water for a minute to remove any residual solvent, removed from the plate, and then air dried at room temperature overnight. This film had a porosity of 72.1% and an electrical resistance of 11.34 mOhm-cm²/0.1 mm of thickness.

Example 11

10 wt % polyethersulfone (Ultrason® E 6020, BASF Corporation), 2.5 wt % polyvinylpyrrolidone (Luvitec® K 90, BASF Corporation), 5 wt % precipitated silica (Zeosil® 1165MP, Solvay), and 0.1 wt % polyacrylic acid (average Mv~1,250,000 (Aldrich)) were added to 82.4 wt % dimethyl sulfoxide (ACS reagent, ≥99.9%, Sigma-Aldrich) under high shear mixing. The formulation was mixed for 5 hour with continuous heating to a temperature of 80° C. The dope solution was allowed to cool overnight after mixing. A film of the dope solution was cast using a BYK-Gardner 4304 Film Casting Knife with a 0.25 mm gap clearance and 8" blade width on an aluminum plate that included engraved 0.5 mm deep diagonal ribs (see FIG. 9A). A 20 g/m² Evalith® Polyester spunbond (Johns Manville) was placed over the cast film and embedded into the solution. A second film of the dope solution was cast using a BYK-Gardner 4304 Film Casting Knife with a 0.25 mm gap clearance and 8" blade width on an aluminum plate that had engraved 0.3 mm deep straight ribs (see FIG. 9B). A 20 g/m² Evalith® Polyester spunbond (Johns Manville) was placed over the cast film and embedded into the solution. Both cast films with the embedded PET were immediately placed in coagulation water baths at room temperature (~80° F.) for 10 minutes to allow film formation by phase inversion. Both cast films were removed from the coagulation water bath and rinsed thoroughly with tap water for a minute to remove any residual solvent. The two ribbed plates with the wet cast films formed on them were then put together and the cast films laminated by compressing them in a carver press at 80° C. and under a pressure of 140 psi for 10 minutes to form a single double ribbed film. The single double ribbed cast film was taken out of the plates and air dried at room temperature overnight. This double ribbed film had a porosity of 73.6% (as determined with an Auto Pore IV 9500 Mercury Porosimeter (Micromeritics Instrument Corp.)) and an electrical resistance of 66.25 mOhm-cm²/0.1 mm backweb (BW) thickness (i.e., not including the thickness of the ribs).

Example 12

10 wt % polyethersulfone (Ultrason® E 6020, BASF Corporation), 2.5 wt % polyvinylpyrrolidone (Luvitec® K 90, BASF Corporation), 5 wt % precipitated silica (Zeosil® 1165MP, Solvay), and 0.1 wt % polyacrylic acid (average Mv~1,250,000 (Aldrich)) were added to 82.4 wt % dimethyl sulfoxide (ACS reagent, ≥99.9%, Sigma-Aldrich) under high shear mixing. The formulation was mixed for 5 hour with continuous heating to a temperature of 80° C. The dope solution was allowed to cool overnight after mixing. A film of the dope solution was cast using a BYK-Gardner 4304 Film Casting Knife with a 0.25 mm gap clearance and 8" blade width on an aluminum plate that included engraved 0.5 mm deep diagonal ribs (see FIG. 9A). A second film of the dope solution was cast using a BYK-Gardner 4304 Film Casting Knife with a 0.25 mm gap clearance and 8" blade width on an aluminum plate that included engraved 0.3 mm deep straight ribs (see FIG. 9B). Both cast films were immediately placed in coagulation water baths at room temperature (~80° F.) for 10 minutes to allow film formation by phase inversion. Both cast films were removed from the coagulation water bath and rinsed thoroughly with tap water for a minute to remove any residual solvent. The two ribbed plates with the wet cast films formed on them were then put together and the cast films laminated by compressing them in a carver press at 80° C. and under a pressure of 140 psi for 10 minutes to form a single double ribbed film. The single double ribbed cast film was taken out of the plates and air dried at room temperature overnight. This double ribbed film had a porosity of 85.6% and an electrical resistance of 17.31 mOhm-cm²/0.1 mm BW thickness.

Example 13

10 wt % polyethersulfone (Ultrason® E 6020, BASF Corporation), 2 wt % polyvinylpyrrolidone (Luvitec® K 90, BASF Corporation), 5 wt % precipitated silica (Zeosil® 1165MP, Solvay), and 0.5 wt % polyacrylic acid (average Mv~1,250,000 (Aldrich)) were added to 82.5 wt % dimethyl sulfoxide (ACS reagent, ≥99.9%, Sigma-Aldrich) under high shear mixing. The formulation was mixed for 5 hour with continuous heating to a temperature of 80° C. The dope solution was allowed to cool overnight after mixing. A film of the dope solution was cast using a BYK-Gardner 4304 Film Casting Knife with a 0.5 mm gap clearance and 8" blade width on an aluminum plate that included engraved 0.5 mm deep diagonal ribs (See FIG. 9A). The cast film was immediately placed in a coagulation water bath at room temperature (~80° F.) for 10 minutes to allow film formation by phase inversion. The cast film was removed from the coagulation water bath and rinsed thoroughly with tap water for a minute to remove any residual solvent, removed from the plate, and then air dried at room temperature overnight. This film had a porosity of 75.0% and an electrical resistance of 13.63 mOhm-cm²/0.1 mm BW thickness.

Example 14

10 wt % polyethersulfone (Ultrason® E 6020, BASF Corporation), 2 wt % polyvinylpyrrolidone (Luvitec® K 90, BASF Corporation), 5 wt % precipitated silica (Zeosil® 1165MP, Solvay), 5 wt % sodium dioctyl sulfosuccinate surfactant (Solvay), and 0.5 wt % polyacrylic acid (average Mv~1,250,000 (Aldrich)) were added to 77.5 wt % dimethyl sulfoxide (ACS reagent, ≥99.9%, Sigma-Aldrich) under high shear mixing. The formulation was mixed for 5 hour with continuous heating to a temperature of 80° C. The dope solution was allowed to cool overnight after mixing. A film of the dope solution was cast using a BYK-Gardner 4304 Film Casting Knife with a 0.5 mm gap clearance and 8" blade width on an aluminum plate that included engraved 0.5 mm deep diagonal ribs (see FIG. 9A). The cast film was immediately placed in a coagulation water bath at room temperature (~80° F.) for 10 minutes to allow film formation by phase inversion. The cast film was removed from the coagulation water bath and rinsed thoroughly with tap water for a minute to remove any residual solvent, removed from the plate, and then air dried at room temperature overnight.

This film had a porosity of 71.6% and an electrical resistance of 7.18 mOhm-cm$^2$/0.1 mm BW thickness.

Example 15

10 wt % polyethersulfone (Ultrason® E 6020, BASF Corporation), 2 wt % polyvinylpyrrolidone (Luvitec® K 90, BASF Corporation), and 5 wt % precipitated silica (Zeosil® 1165MP, Solvay) were added to 83 wt % dimethyl sulfoxide (ACS reagent, ≥99.9%, Sigma-Aldrich) under high shear mixing. The formulation was mixed for 5 hour with continuous heating to a temperature of 80° C. The dope solution was allowed to cool overnight after mixing. A film of the dope solution was cast using a BYK-Gardner 4304 Film Casting Knife with a 0.5 mm gap clearance and 8" blade width on an aluminum plate that had engraved 0.5 mm deep diagonal ribs (see FIG. 9A). The cast film was immediately placed in a coagulation water bath at 20° C. for 10 minutes to allow film formation by phase inversion. The cast film was removed from the coagulation water bath and rinsed thoroughly with tap water for a minute to remove any residual solvent, removed from the plate, and then air dried at room temperature overnight. This film had a porosity of 75.0% and an electrical resistance of 13.63 mOhm-cm$^2$/0.1 mm BW thickness.

Example 16

10 wt % polyethersulfone (Ultrason® E 6020, BASF Corporation), 2 wt % polyvinylpyrrolidone (Luvitec® K 90, BASF Corporation), and 5 wt % precipitated silica (Zeosil® 1165MP, Solvay) were added to 83 wt % dimethyl sulfoxide (ACS reagent, ≥99.9%, Sigma-Aldrich) under high shear mixing. The formulation was mixed for 5 hour with continuous heating to a temperature of 80° C. The dope solution was allowed to cool overnight after mixing. A film of the dope solution was cast using a BYK-Gardner 4304 Film Casting Knife with a 0.5 mm gap clearance and 8" blade width on an aluminum plate that included engraved 0.5 mm deep diagonal ribs (see FIG. 9A). The cast film was immediately placed in a coagulation water bath at 50° C. for 10 minutes to allow film formation by phase inversion. The cast film was removed from the coagulation water bath and rinsed thoroughly with tap water for a minute to remove any residual solvent, removed from the plate, and then air dried at room temperature overnight. This film had a porosity of 78.2% and an electrical resistance of 27.75 mOhm-cm$^2$/0.1 mm BW thickness.

Example 17

10 wt % polyethersulfone (Ultrason® E 6020, BASF Corporation), 2 wt % polyvinylpyrrolidone (Luvitec® K 90, BASF Corporation), and 5 wt % precipitated silica (Zeosil® 1165MP, Solvay) were added to 83 wt % dimethyl sulfoxide (ACS reagent, ≥99.9%, Sigma-Aldrich) under high shear mixing. The formulation was mixed for 5 hour with continuous heating to a temperature of 80° C. The dope solution was allowed to cool overnight after mixing. A film of the dope solution was cast using a BYK-Gardner 4304 Film Casting Knife with a 0.5 mm gap clearance and 8" blade width on an aluminum plate that included engraved 0.5 mm deep diagonal ribs (see FIG. 9A). The cast film was immediately placed in a coagulation water bath at 80° C. for 10 minutes to allow film formation by phase inversion. The cast film was removed from the coagulation water bath and rinsed thoroughly with tap water for a minute to remove any residual solvent, removed from the plate, and then air dried at room temperature overnight. This film had a porosity of 77.8% and an electrical resistance of 66.25 mOhm-cm$^2$/0.1 mm BW thickness.

It will be apparent to those having skill in the art that many changes may be made to the details of the above-described embodiments without departing from the underlying principles of the invention.

The invention claimed is:

1. A porous membrane comprising:
    a backweb comprising first and second opposite major surfaces;
    a plurality of unitary, regularly-shaped protrusions formed in and unitary with the first major surface; and
    a solution-cast three-dimensional polymer matrix defining interconnecting pores that provide overall first major surface-to-second major surface fluid permeability, the polymer matrix providing innate electrolyte-wettability to surfaces of the interconnecting pores, wherein a porosity of the plurality of unitary, regularly-shaped protrusions is the substantially the same as a porosity of the backweb.

2. The porous membrane of claim 1, wherein the plurality of unitary, regularly-shaped protrusions are regularly-spaced in the first major surface.

3. The porous membrane of claim 2, in which the protrusions comprise ribs and a remainder of the porous membrane comprises at least a portion of the backweb, in which the ribs have an overall height to backweb thickness ratio of up to 10:1.

4. The porous membrane of claim 1, in which the membrane is formed by non-solvent induced phase separation.

5. The porous membrane of claim 1, in which the membrane is non-rigid and the polymer matrix comprises at least one thermoplastic polymer.

6. The porous membrane of claim 5, in which the polymer matrix further comprises at least one additional polymer that can function as a pore-forming agent, a structure-enhancing agent, wettability-enhancing agent, or combinations thereof.

7. The porous membrane of claim 1, further comprising a particulate or fibrous filler included with the polymer matrix.

8. The porous membrane of claim 1, further comprising a surfactant dispersed throughout the interconnecting pores of the polymer matrix.

9. The porous membrane of claim 1, in which the membrane has a porosity of about 60% to about 90%.

10. A freestanding composite comprising:
    a substrate; and
    a porous membrane of claim 1 formed on the substrate.

11. The composite of claim 10, in which the substrate is at least partially embedded in the second major surface of the membrane.

12. A freestanding composite comprising:
    a first membrane comprising a first porous membrane of claim 1 laminated to a second membrane.

13. The composite of claim 12, in which the second membrane comprises a second porous membrane of claim 1 and in which the second major surface of the first membrane is porously laminated to the second major surface of the second membrane to provide overall first membrane first major surface-to-second membrane first major surface fluid permeability.

14. The composite of claim 13, in which multiple unitary, regularly-shaped and regularly-spaced protrusions are formed in the second membrane first major surface.

15. The composite of claim 14, in which the protrusions on the first membrane first major surface and the protrusions on the second membrane first major surface each comprise differing patterns of continuous ribs, discontinuous ribs, or combinations thereof.

16. The composite of claim 13, further comprising a substrate embedded in each of the first and second membranes.

17. A method of making a porous membrane of claim 1, the method comprising:
- dissolving at least one polymer in at least one solvent to form a polymer dope solution;
- casting a thin layer of the polymer dope solution on a surface, wherein the surface includes an inverse pattern of the plurality of unitary, regularly-shaped protrusions formed in the first major surface of the membrane; and
- exposing the thin layer of the polymer dope solution to a non-solvent until phase inversion occurs and polymer precipitates on the surface forming the polymer matrix of the membrane.

18. A method of forming a composite with patterns on both sides of the composite, the method comprising:
- providing a first membrane comprising a first porous membrane of claim 1;
- providing a second membrane comprising a second porous membrane of claim 1;
- placing together the second major surface of the of the first membrane and the second major surface of the second membrane; and
- applying heat and pressure to the membranes.

19. A battery separator comprising the porous membrane of claim 1.

20. An energy storage device comprising the porous membrane of claim 1.

* * * * *